(12) United States Patent
Petit et al.

(10) Patent No.: US 10,718,468 B2
(45) Date of Patent: Jul. 21, 2020

(54) METHOD AND APPARATUS FOR DISPENSING GASEOUS FUEL TO A VEHICLE

(71) Applicant: CMD Corporation, Appleton, WI (US)

(72) Inventors: Rock J. Petit, Freedom, WI (US); Mitchell J. Hein, Green Bay, WI (US); Paul A. Selle, Appleton, WI (US)

(73) Assignee: CMD Corporation, Appleton, WI (US)

( * ) Notice: Subject to any disclaimer, the term of this patent is extended or adjusted under 35 U.S.C. 154(b) by 460 days.

(21) Appl. No.: 15/136,437

(22) Filed: Apr. 22, 2016

(65) Prior Publication Data

US 2017/0023180 A1 Jan. 26, 2017

Related U.S. Application Data

(60) Provisional application No. 62/310,618, filed on Mar. 18, 2016, provisional application No. 62/152,493, filed on Apr. 24, 2015.

(51) Int. Cl.
*F17C 5/06* (2006.01)
*F17C 7/00* (2006.01)
*F16K 15/02* (2006.01)

(52) U.S. Cl.
CPC .............. *F17C 5/06* (2013.01); *F16K 15/023* (2013.01); *F17C 7/00* (2013.01);
(Continued)

(58) Field of Classification Search
CPC .................. F17C 5/06; F17C 2205/0376; F17C 2205/0142; F17C 2221/012; F17C 2227/0157
See application file for complete search history.

(56) References Cited

U.S. PATENT DOCUMENTS 5,255,699 A 10/1993 Herzen et al.
5,400,253 A * 3/1995 O'Connor .................... 364/442
(Continued)

FOREIGN PATENT DOCUMENTS

JP 2003-172497 * 6/2003
JP 2009236270 10/2009
WO 2012123349 9/2012

OTHER PUBLICATIONS

English translation of Sasaki JP2003-172497.*
International Search Report, dated Jul. 1, 2016, European Patent Office, Rijswijk Netherlands.

*Primary Examiner* — Andrew D StClair
(74) *Attorney, Agent, or Firm* — George R. Corrigan; Stephen C. Jensen

(57) ABSTRACT

A method and apparatus fueling vehicle with gaseous fuel includes storage vessels, dispensing sub-stations and a controller. The storage tanks or vessels can be at different pressures. The plurality of dispensing sub-stations each include a dispensing hose and a control valve. Each dispensing sub-station is in controllable fluid communication with the storage vessels so that fluid can flow from the storage vessels through the dispensing sub-station to a vehicle tank. A dispensing hose, and a control valve of the dispensing sub-stations are in the fluid flow paths. The controller receives feedback indicative of a filling parameter from the dispensing sub-stations, and provides control signals to the control valves of the first and second dispensing sub-station to implement one or more desired fill schemes.

2 Claims, 23 Drawing Sheets

(52) U.S. Cl.
CPC ............. F17C 2201/052 (2013.01); F17C 2205/0142 (2013.01); F17C 2205/0326 (2013.01); F17C 2205/0332 (2013.01); F17C 2205/0335 (2013.01); F17C 2205/058 (2013.01); F17C 2221/012 (2013.01); F17C 2221/03 (2013.01); F17C 2221/033 (2013.01); F17C 2221/035 (2013.01); F17C 2223/0123 (2013.01); F17C 2223/0153 (2013.01); F17C 2223/0161 (2013.01); F17C 2223/036 (2013.01); F17C 2225/0123 (2013.01); F17C 2225/036 (2013.01); F17C 2227/0157 (2013.01); F17C 2227/0337 (2013.01); F17C 2227/041 (2013.01); F17C 2227/042 (2013.01); F17C 2227/043 (2013.01); F17C 2250/032 (2013.01); F17C 2250/034 (2013.01); F17C 2250/043 (2013.01); F17C 2250/0439 (2013.01); F17C 2250/0443 (2013.01); F17C 2250/0636 (2013.01); F17C 2260/025 (2013.01); F17C 2265/065 (2013.01); F17C 2270/0139 (2013.01); F17C 2270/0184 (2013.01); Y02E 60/321 (2013.01)

(56) References Cited

U.S. PATENT DOCUMENTS

| | | |
|---|---|---|
| 5,454,408 A | 3/1995 | Dibella et al. |
| 5,406,988 A | 4/1995 | Hopkins |
| 5,413,309 A | 5/1995 | Giesler |
| 5,752,552 A | 5/1998 | Kountz et al. |
| 5,771,947 A | 6/1998 | Kountz et al. |
| 5,771,948 A | 6/1998 | Kountz et al. |
| 5,810,058 A | 9/1998 | Kountz et al. |
| 5,868,176 A | 2/1999 | Barajas et al. |
| 5,881,769 A | 3/1999 | Hopson |
| 5,881,779 A | 3/1999 | Kountz et al. |
| 5,884,575 A | 3/1999 | Krasnov |
| 5,970,786 A | 10/1999 | Smith et al. |
| 6,035,894 A | 3/2000 | Weh et al. |
| 6,343,630 B1 | 2/2002 | Dubinsky |
| 6,708,573 B1 | 3/2004 | Cohen et al. |
| 6,851,657 B2 | 2/2005 | Tawns |
| 7,028,724 B2 * | 4/2006 | Cohen ............. F02M 21/0206 141/392 |
| 7,267,140 B2 | 9/2007 | Weh et al. |
| 7,424,897 B2 | 9/2008 | Weh et al. |
| 7,458,400 B2 | 12/2008 | Weh et al. |
| 7,494,158 B2 | 2/2009 | Weh et al. |
| 7,568,507 B2 | 8/2009 | Farese et al. |
| 7,921,883 B2 | 4/2011 | Cohen et al. |
| 8,033,305 B2 | 10/2011 | Weh et al. |
| 8,061,394 B2 | 11/2011 | Weh et al. |
| 8,122,918 B2 | 2/2012 | Handa |
| 8,286,662 B2 | 10/2012 | Weh et al. |
| 8,360,112 B2 | 1/2013 | Allidieres et al. |
| 8,371,341 B2 | 2/2013 | Gray |
| 8,433,441 B2 | 4/2013 | Oldham |
| 8,578,957 B2 | 11/2013 | Wolff |
| 8,613,201 B2 | 12/2013 | Bayliff et al. |
| 8,616,252 B2 | 12/2013 | Clever et al. |
| 8,616,524 B2 * | 12/2013 | Tiberghien ............ F16L 29/007 251/186 |
| 8,631,837 B2 | 1/2014 | Lauber et al. |
| 8,662,115 B2 | 3/2014 | Mori |
| 8,783,303 B2 | 7/2014 | Harty et al. |
| 8,863,791 B2 | 10/2014 | Aehle et al. |
| 8,899,278 B2 | 12/2014 | Cohen et al. |
| 8,950,441 B2 | 2/2015 | Ding et al. |
| 8,960,019 B1 | 2/2015 | Oldham et al. |
| 9,016,329 B2 | 4/2015 | Mori |
| 9,279,529 B2 | 3/2016 | Zhang et al. |
| 9,284,178 B2 | 3/2016 | Donnelly et al. |
| 9,303,776 B2 | 4/2016 | Zhang et al. |
| 9,309,991 B2 | 4/2016 | Shimane |
| 9,316,215 B2 | 4/2016 | Mackey |
| 9,322,682 B2 | 4/2016 | White et al. |
| 2002/0053365 A1 * | 5/2002 | Mutter ....................... F17C 5/06 141/4 |
| 2003/0164202 A1 * | 9/2003 | Graham .................... B60S 5/02 141/98 |
| 2006/0005895 A1 * | 1/2006 | Gram ........................ F04B 5/02 141/104 |
| 2008/0246275 A1 | 10/2008 | Weh et al. |
| 2009/0151812 A1 * | 6/2009 | Allidieres ............... F17C 5/007 141/11 |
| 2009/0167019 A1 | 7/2009 | Weh et al. |
| 2010/0307636 A1 * | 12/2010 | Uemura .................... F17C 5/06 141/4 |
| 2012/0125482 A1 * | 5/2012 | Mori ....................... F17C 5/007 141/98 |
| 2012/0132301 A1 | 5/2012 | Hobmeyr et al. |
| 2012/0216915 A1 * | 8/2012 | Takata ....................... F17C 5/06 141/82 |
| 2013/0192701 A1 | 8/2013 | Poorman |
| 2013/0327439 A1 | 12/2013 | Pitney |
| 2014/0352840 A1 | 4/2014 | Blanchet |
| 2014/0172492 A1 | 6/2014 | Utal |
| 2014/0202585 A1 | 7/2014 | Barker |
| 2014/0246117 A1 | 9/2014 | Ding |
| 2015/0083273 A1 * | 3/2015 | Thiessen ................... F17C 5/06 141/94 |
| 2015/0153210 A1 | 6/2015 | Bartlett et al. |
| 2015/0308621 A1 | 10/2015 | Mathison |
| 2016/0003415 A1 | 1/2016 | Cohen et al. |
| 2016/0017823 A1 | 1/2016 | Sloan et al. |
| 2016/0025231 A1 | 1/2016 | Watanabe |
| 2016/0102810 A1 | 4/2016 | Barker |
| 2016/0116113 A1 | 4/2016 | Mrowzinski |
| 2016/0123536 A1 | 5/2016 | Grimmer et al. |

\* cited by examiner

METHOD AND APPARATUS FOR DISPENSING GASEOUS FUEL TO A VEHICLE

FIELD OF THE INVENTION

The present disclosure relates generally to the art of dispensing gaseous fuels to vehicles.

BACKGROUND OF THE INVENTION

The popularity of gaseous fuels, such as compressed natural gas (CNG), renewable natural gas (RNG), propane, hydrogen, dimethyl ether (DME), for powering vehicles has increased. Thus, the need to deliver gaseous fuel to vehicles has increased. The infrastructure used to deliver liquid fuels such as gasoline and diesel is not well suited to deliver gaseous fuels. Liquid fuels may be pumped above the tank to be filled, and gravity allows the fuel to flow into the tank. The pumping is the same regardless of how full the tank is, so the first gallon into a tank fills at the same rate as the last gallon into the tank. However, the rate of filling a tank with gaseous fuel depends on the pressure differential between the fuel source and the tank being filled. As the tank fills, the pressure increases, and the fill rate decreases.

Liquid fuel filling stations (gasoline, diesel, etc.) have one pump per dispenser, so the number of dispensers in use doesn't affect the fill rate. Gaseous fuel dispensers do not have pumps as do liquid fuel dispensers, so the fill rate depends on the number of tanks being filled. Also, the fittings and connections used for liquid fuel are not suitable for gaseous fuels.

The description herein uses CNG to refer to compressed natural gas, and most of the background and description is provided using CNG as an exemplary gaseous fuel. However, other gaseous fuels, such as renewable natural gas (RNG), propane, hydrogen, dimethyl ether (DME), biogas, LPG (propane), LNG (liquid natural gas), CNG (compressed natural gas), ANG (absorbed natural gas), Hydrogen 20%+ CNG 80% (hythane- or similar % blends), bio-methane, bio-CNG or bioCNG or Biocng, hybrid-combo (combinations of the above and/or electric and or petroleum products could be used, and the invention is not limited to CNG except where CNG is claimed. Also, when "gas" is used herein it refers to gaseous fuel, and gasoline is used to refer to gasoline.

Traditional CNG filling stations include 3 large pressure vessels for storage of the compressed natural gas (CNG) at pressures up to 5000 psi. The storage tanks are filled using one or more compressors that receive natural gas through a pipeline or other storage vessels such as tube trailers, and compress it in the tanks. The storage vessels (each typically 11,000 standard cubic feet SCF) reduce the amount of time it takes to fill a vehicle (typically 80-150 diesel gallon equivalent DGE) by having more CNG volume at higher pressure than the compressing station could normally provide on demand. This typical system has been used for years in the CNG industry but it has deficiencies related to filling time as compared to traditional diesel truck filling times.

Traditional diesel trucks fill at a rate of 20-30 gallons per minute depending on venting options. Equivalent CNG stations using typical NGV2 nozzles (a standard type for natural gas) fill at a rate up to 12 DGE (Diesel Gallon Equivalent) when the filling stations 3 storage vessels are at maximum capacity. However, if a second or third vehicle arrives for filling before the 3 storage vessels are refilled it creates a scenario where the second and third vehicle quickly consume the limited stored pressure and then all of the vehicles being filled wait for the compressors to catchup. This makes the first vehicle wait for an extra-long time to fill up, since one compressor may only produce 265 scfm if the inlet pressure is 30 psi from the pipeline.

Recent improvements have been to provide multiple compressors at each filling station, but there can still be delays. Truckers and other CNG users don't want to wait 10 or 20 minutes to fill up just because additional vehicles show up at the adjacent dispensers. Diesel truckers are used to filling up a 120 gallon tank in 4 minutes. Under ideal conditions it takes 10 minutes to fill a 120 DGE tank with CNG, but with concurrent vehicles filling up, the fill up time can be much longer.

Typical pipe fittings and sub-components sold in any industry have traditionally experienced major flow limitations when "quick-disconnect" junctions are required. This perpetuation has continued into the CNG industry but the flow problem has become amplified because of the extremely high flow rates involved and the desire to fill CNG vehicles as fast as possible.

FIG. 4 shows a prior art CNG filling station with three stored tanks 401-403 at various pressure, depending on the usage. The ideal pressure is up to 5000 psi, but as one or more is depleted their pressure is lessened, and they are referred to typically as High (H), Medium (M), and Low (L) pressure based on their current pressure. If a vehicle is switched onto a bank already in use by a different vehicle, the CNG flows to the less full vehicle, thus the new vehicle typically "steals" all the available gas pressure, leaving the first vehicle with little or no gas flow. A dispenser 407 feeding the first vehicle detects that there is no flow of gas, and will switch that vehicle to the next higher bank. If that happens on the high bank, the vehicle is deemed full and the filling ends, without the vehicle getting a full fill. Problems can also be caused by the dispensers switching banks before or after they have used all of the stored gas that is available to them in that bank. CNG dispensers typically operate strictly on flow rate to determine when to switch between the three banks of stored pressure. However, flowrate is only part of the picture. A system based strictly on flow can be fooled by the gas being delivered by the compressors, which can artificially prolong the time a vehicle spends on a given bank, and clog up the queue. Conversely, a dispenser which is set up to handle "high flow" vehicles may switch between banks too early if a "low flow" or nearly full vehicle connects to the system.

The station of FIG. 4 includes a priority panel 405 that makes the connections between dispenser 407 (as well as an optional dispenser 409) and storage tanks 401-403. A dryer 410 receives gas (usually from an underground utility pipe at a psi at 10-110 psi). A multistage compressor 412 receives the dried gas and provides compressed gas through priority panel 405 to tanks 401-403. A second compressor 412A may be included. Priority panel 405 includes the connections and valves to connect the storage tanks to the compressor and to the dispensers.

Another problem with filling a vehicle tank with arises when the nozzle is connected to the vehicle. A traditional diesel or gasoline filling simply requires the nozzle be inserted into the tank fill opening, and the lever pulled to activate the pump, but CNG requires more operations. The nozzle must be locked onto the vehicle with an air-tight seal, and inserting the nozzle unlocks a lever. The lever is then pulled to open a flow path. A pressure sensor must be activated, an upstream valve is opened, and then gas can flow. There are safety features that create turbulence (nonlaminar flow), including a check valve in the vehicle, the valve in the nozzle, two break-away safety points in the hose with safety check valves, and the upstream valve. Accordingly, a nozzle that makes filling a tank with CNG less complex is desirable.

Another problem with filling a vehicle tank arises because CNG requires a safety check valve that prevents CNG from escaping when the nozzle is not connected to the vehicle. Existing check valves create turbulence and a lack of laminar flow because they include sharp edges and changes in direction (of the flowing gas). The turbulence heats the CNG, meaning there is less gas for a given pressure (as the CNG heats it expands). This reduces the fill rate and reduces the amount of CNG (in DGE) in the tank when the fill is completed. Accordingly, a check valve that does not heat the CNG or create turbulence is desired. The valves can be located in the vehicle, or in the nozzle. When in the vehicle they prevent CNG from leaking, and preferably, the valve will have a default position that is closed, and that is only opened when the higher pressure from the storage tanks is applied to the valve.

Thus, an improved filling technique for gaseous fueling that improves the filling rate and reduces filling time is desired.

SUMMARY OF THE PRESENT INVENTION

According to a first aspect of the disclosure a gaseous fuel station for filling vehicle tanks with fuel includes a plurality of storage vessels, a plurality of dispensing sub-stations and a controller. The plurality of storage vessels include a first storage vessel at a first pressure, and a second storage vessel at a pressure greater than the first pressure. The plurality of dispensing sub-stations each include a dispensing hose and a control valve. Each dispensing sub-station is in controllable fluid communication with each of the first and second storage vessels so that fluid can flow from the storage vessels through the dispensing sub-station to a vehicle tank. The dispensing hose, and a control valve of the first dispensing sub-station are in the first fluid flow path. The controller receives feedback indicative of a filling parameter from the first and second dispensing sub-stations, and provides control signals to the control valves of the first and second dispensing sub-station to implement a desired fill scheme.

According to a second aspect of the disclosure a gaseous fuel station for filling vehicle tanks with fuel includes a plurality of storage vessels, a plurality of dispensing sub-stations, a fitting and a controller. The plurality of dispensing sub-stations each include a dispensing hose and a controllable fluid flow path from each of the plurality of storage vessels to a vehicle tank. The fitting is capable of connecting to the vehicle tank and capable of connecting to at least two dispensing substations, whereby the flow into the tank is from at least two dispensing sub stations. The controller controls the controllable fluid paths.

According to a third aspect of the disclosure a gaseous fuel dispenser that can be connected to a source of gaseous fuel includes comprising a nozzle for connecting to a vehicle having a tank to be filled. The nozzle has a manual activation mechanism for enabling fuel flow, wherein the activation mechanism has at least three operating positions.

According to a fourth aspect of the disclosure a non-contact check valve used in filling a vehicle tank with gaseous fuel has an air foil having a closed position and an open position. A pressure greater on a first side of the air foil than on a second side of the air foil causes the valve to move and remain in the open position.

According to a fifth aspect of the disclosure a refueling station for filling vehicle tanks with a gas fuel includes a gas compressor, at least three storage tanks, a plurality of gas fuel dispensers, and a controller. The storage tanks receive compressed gas from the gas compressor. The gas fuel dispensers are in fluid communication with the storage tanks, and each has a fluid flow path with a controllable flow rate. Each gas fuel dispenser has a dispensing hose, and a dispensing nozzle for connecting to a vehicle. A controller controls the fluid flow rate in each fluid flow path. The controller includes at least a first flow control module that increases or decreases the refueling rate for each dispenser in accordance with a first desired fill scheme.

According to a sixth aspect of the disclosure a gaseous fuel dispenser for filling vehicle tanks with fuel includes a connection for connecting to one of a plurality of storage vessels, a dispensing hose, at least one control valve, a gas flow path that includes the connection, the control valve, and the dispensing hose, and a controller. The controller receives feedback indicative of a filling parameter from the gas flow path, and provides control signals to the control valve to implement a desired fill scheme.

According to a seventh aspect of the disclosure a method for dispensing gaseous fuel includes connecting a hose to at least one of a plurality of storage vessels, providing fill feedback of at least one fill parameter from a gaseous fuel flow path, and controlling a valve in the gaseous fuel flow path in response to the fill feedback, to implement a desired fill scheme.

The station includes a priority panel that provides the controllable fluid paths in one alternative.

A third storage vessel at a third pressure and in controllable fluid communication with the dispensing sub-stations is provided in another alternative.

There are at least three dispensing sub-stations in one embodiment.

The desired fill scheme is one of a first fill scheme, an even fill scheme, and a preferred fill scheme in various embodiments.

Heat exchangers dissipates heat from fluid flowing in the fluid paths in one alternative.

The dispensing sub-stations each include an activating mechanism having a first position associated with a first operation, a second position associated with a second operation, and a third position associated with a third operation in one embodiment.

The dispensing sub-stations each include a valve in the fluid paths in various embodiments.

Each dispensing substation includes a customer-viewable gas flow meter that displays the flow into the vehicle tank in one alternative.

The mechanism operating positions each have a function associated therewith, and fuel flow is not enabled unless each function is performed in a desired sequence and/or the second operating position cannot be accessed before the first operating position in various embodiments.

The nozzle includes a locking mechanism and a valve, and the first operating position activates the locking mechanism so that the nozzle locks onto the vehicle, and the second operating position opens the valve in one embodiment.

The manual activation mechanism is a lever which moves in a path, and the path can include at least two changes of direction in another alternative.

The non-contact check valve includes a first guide to maintain the air foil in a desired position with respect to gas flow past the air foil in one alternative.

There are communication links between each of the dispensers and the priority panel in one embodiment.

The controller includes a plurality of flow control modules, and each module increases or decreases the refueling rate for each dispenser in accordance with a unique one of a plurality of desired fill schemes, and a user can select which flow control module is active in various embodiments.

A second connection for connecting to the storage vessels is in controllable fluid communication with a second control valve and in a second gas flow path that provides feedback indicative of a filling parameter from the second gas flow path to the controller, and the controller provides control signals to the second control valve to implement the desired fill scheme in one alternative.

The controller includes at least two fill scheme modules in various embodiments.

The desired fill scheme is selecting from a plurality of desired fill schemes in one alternative.

The connection between the controller and the first and second dispensing sub-stations is an ethernet link in another alternative.

There is an ethernet link between the first and second dispensing sub-stations in one embodiment.

The controller includes a plurality of flow control modules, each of which increases or decreases the refueling rate for each dispenser in accordance with a unique one of a plurality of desired fill schemes in one alternative.

A user interface is connected to the controller, and the controller activates a flow control modules in response to a signal received from the user interface in another alternative.

Other principal features and advantages of this disclosure will become apparent to those skilled in the art upon review of the following drawings, the detailed description and the appended claims.

Figure 1:
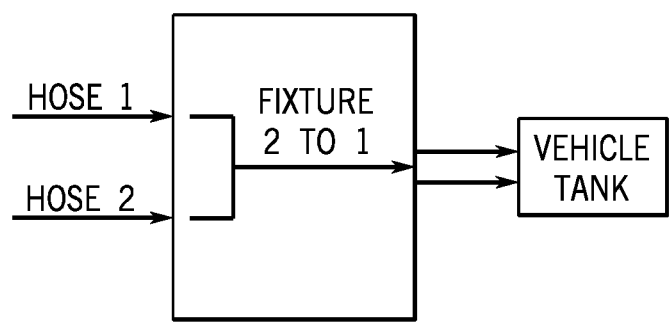
FIG. 1 is a block diagram of one aspect of the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular schemes and designs, it should be understood at the outset that the invention can also be implemented with other schemes and designs.

A filling station for gaseous fuel is described herein. Generally, the station includes multiple storage tanks, a priority panel, and multiple dispensers. A controller controls the flow rate individually for several dispensers, either by controlling the flow with valves etc., or by selecting which storage tank is connected to which dispenser. The rate is controlled in accordance with a fill scheme, and the fill scheme is preferably selectable by the user, such as by the station manager, owner or from a remote location. The scheme can be selected locally or remotely, and can be changed as desired. The flow rates to each dispenser are monitored in one embodiment, and communication links between the dispensers, the priority panel and the controller are used to provide feedback of a filling parameter (pressure, flow, temperature, etc.) to the controller, and to provide control signals to valves. Also, a communication link can be used to change schemes, or that can be done at the controller on a user interface.

One embodiment provides for a nozzle to connect to the vehicle being filled with a three position lever or activating mechanism. Each position of the mechanism corresponds to one activity needed to connect and fill the vehicle. Each movement of the lever to a new operating position (i.e., a position where moving the lever thereto causes an operation to occur) results in the completion of one of the operations or steps need to start the fill process. When the lever is in the home position the nozzle is connected to the vehicle. Then, the lever is moved, preferably along a path or track to a second position, the movement of the lever causes the nozzle to be locked to the vehicle. Then, the lever is moved along the path or track to a third position (preferably the path/track includes a change in direction so the user intuitively knows a second operation is being performed). When the lever is moved to the third position it causes a vent valve to close. The lever is then moved to the filling position along the path/track (again, preferably with a change in direction), to open a valve and filling can occur. When the fueling is completed the process is reversed. Moving the lever to the third position closes the safety check valve. Moving the lever past the second position vents the nozzle, and moving the lever to the home position unlocks the nozzle from the vehicle. Fewer or more positions and operations could be provided.

Another embodiment includes a safety check valve that reduces turbulence when CNG flows through it. The valve can be in the dispenser or in the vehicle. The valve is designed with an air foil that causes the valve to move into an open position when there is gas flow. The valve is held in place with a minimal structure, such as a bearing supported by two to four supports or struts at each end. Alternatively it can be centered using magnets. Magnets can be used to bias it in a closed position, as can gravity, a spring, etc. Another embodiment of the valve is to have it be manually or solenoid (or other automated) activated, such as by the lever described with respect to FIG. 23.

One embodiment includes dispensers having feedback indicative of a filling parameter, such as flow (from a flow meter), pressure (from a pressure meter), volume filled, temperature, audible noise, or other parameters, and a control valve and a logic controller such that all dispensers could communicate with the controller and each other and the controller toggles control valves in such a way as to give different levels of priority to different concurrent customers. Thus, first or preferred customers can fill at a faster rate than would otherwise be possible. This can be used in conjunction with the other aspects of the invention, or by itself.

Preferably a central controller receives data/feedback regarding flow from each dispenser. The control than regulates the valves at each dispenser to implement the fill scheme desired. Controller, as used herein, refers to any hardware or software that controls one or more dispensers. A controller can be centrally located, or dispersed amongst several locations. The controller logic can control valves to implement any desired fill scheme. Examples of such schemes include first fill, even fill, preferred status, or combinations thereof. These or any other desired fill scheme could be implemented.

Each dispenser preferably includes a control valve and a logic controller such that all dispensers would communicate with each other at a particular CNG filling station and adjust the control valves in such a way as to give different levels of priority to different concurrent customers. This feature could easily be set or changed according to fueling station owner preferences to provide various outcomes such as fair fill, first fill, preferred status, and full fill, each of which is explained below. Other modes are also possible, including modes that require control beyond the dispenser.

"First Fill" controls the valves such that the first customer to arrive gets greater flow so that their dispenser fills their vehicle as fast as possible without reducing their fill rate due to other customers initiating their filling procedure. Those customers not "first" could share an equal fill, or be prioritized by the order they started to fill, until the first is completed. Each customer in turn would get priority in order of their beginning to fill. This is accomplished by adding unique PLC control system logic that senses that two or more vehicles are fueling. The PLC then triggers the First Fill logic to limit or stop the gas flow to any subsequent vehicles waiting in "queue" by modulating or closing their associated control valves. Once the priority vehicle has completed filling, the logic allows the next vehicle in queue to start or continue with fueling by modulating its associated control valve, while limiting any subsequent vehicle fueling flows. This would accomplish a "first come, first serve" approach to vehicle fueling. One alternative uses time stamping in software logic to know the order customers arrived.

Fair Fill" provides that all concurrent customers share the available storage and compressor flow in such a way that each customer has a proportionally "fair" filling time. In other words there is proportionally fair flow going to all vehicles. The PLC control system would recognize that more than one vehicle is fueling and would modulate all control valves such that the gas flowing to all concurrent vehicles is equal. As one vehicle completes filling, the PLC control system would modulate all control valves to proportionally increase the flow to the remaining vehicles that are fueling. This would accomplish a "fair share" approach to vehicle fueling by truly measuring the flow rate with a flow meter for each hose assembly, or approximately fair if using any of the simpler valving methods described herein.

"Preferred Status" would allow customers who have a Preferred Status (such as a card or RFID tag) to get higher priority at their dispenser with respect to other concurrent customers who do not have a Preferred Status. The card or RFID tag may be electronically read at the dispenser like a credit card. Once the Preferred Status card is read at the dispenser, the PLC control system modulates the control valves on non-Preferred Status dispensers to limit their flow such that the Preferred Status customer receives the maximum available gas flow. Non-Preferred Status customers would still be able to start fueling, as long as they do not reduce the flow to the Preferred Status customer. This feature could be used in conjunction with "Fair Fill" or "First Fill" when non-Preferred Status customers are fueling. Preferred Status cards would typically be utilized for station owners that are running a fleet of trucks, but also provide CNG fueling for public use. Station owner fleet vehicle drivers would be issued the Priority Status cards for better fueling times.

"Full Fill" uses one of a variety of modes described herein (or other similar modes) to insure a vehicle gets filled to its maximum pressure and thus maximum volume of CNG, without one vehicle affecting another vehicle's ability to truly fill up. This fill scheme can be used in conjunction with other fill schemes.

An alternative that includes a configurable station has physical valve(s), or electrical switch(es), or software switch(es) used by a station manager/owner to select which of the features or above modes are best for them or their customers in the coming days, weeks, or months. It can be easily changed or reconfigured as needed and as often as the station manager, owner, or market dictates. Automatically changing configurations for a station could be done by a computer program in the controller automatically, or semi-automatically, to switch between the modes to optimize for any criteria: including time of day; number of vehicles refueling; maximum volume output; station profits; minimum station maintenance; user satisfaction; preferred customer satisfaction; preferred credit cards; or the like. It could also store this type of information and suggest additional hardware for station optimization. The configuration could also be initiated from a remote location, such as by using an internet connection.

Another aspect of the invention provides a heat exchanger or cooling fins before and/or after the CNG storage vessels to minimize the temperature of the CNG before it is dispensed into the vehicle so it shrinks less in the vehicle and is dispensed more efficiently at a lower temperature. This can be used in conjunction with the other aspects of the invention, or by itself.

Another aspect of the invention provides for improving laminar flow of CNG within the dispenser, flexible filling hose, break-away fitting, and check valve nozzle by using oversized ports and oversized pipe fittings to allow maximum possible flow well beyond the traditional 12 GGE (Cv=2.5-3.0) experienced in the prior art. Additional flow benefits can be experienced by replacing traditional vehicle receptacles and check valves with grossly oversized ports. This can be used in conjunction with the other aspects of the invention, or by itself.

Another aspect of the invention provides for two or more hoses or two or more dispensers simultaneously filling one vehicle. This would result in a CNG vehicle fill rate of 30-60 DGE. Preferably, this uses existing and readily available dispensing hardware. For example, a device that receives two hoses could be disposed between the two dispenser hoses and the tank to be filled. Or, the tank to be filled can have two fill inlets, or be comprised of two sub tanks. This can be used in conjunction with the other aspects of the invention, or by itself. FIG. 1 shows a hose 1 and hose 2 filling a single vehicle tank.

Another aspect of the invention provides for installing a gas flow meter, or other sensor to provide fill feedback information, such as weight, temperature, pressure, etc, on the dispenser or hose assembly to display DGE instead of traditional PSI (pounds/square inch) so the vehicle driver can better see what is getting put into the vehicle. This doesn't change the flow rate, but helps the vehicle driver (or user or consumer) understand how much has been filled. This can be used in conjunction with the other aspects of the invention, or by itself.

Using one or more of the above aspects of the invention should result in shorter fill times, and increased acceptance of CNG as a viable fuel for the future, which in turn reduces air pollution and our dependence on the oil industry.

Figure 2:
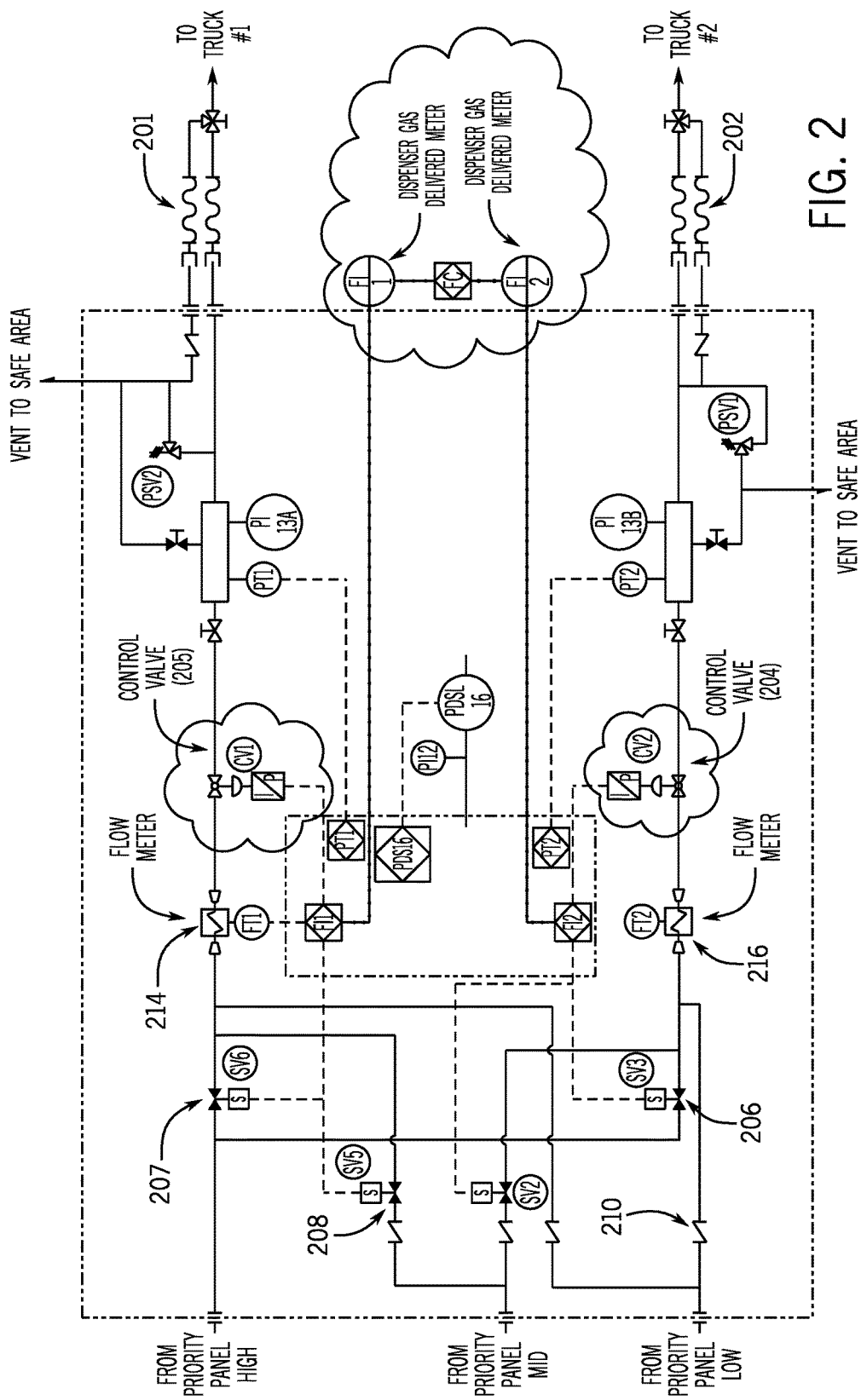
FIG. 2 is a diagram of a dispenser implementing one embodiment.

FIG. 2 show a dispenser that implements one embodiment. Hose/nozzles 201 and 202 are used to fill different vehicles. Additional hoses can be used. Valves 204-210 can be selectively opened and closed to connect each of nozzle/hose 201 and 202 to any of the three pipes coming from the priority panel, and thus to any of the storage tanks (low, medium and high). In practice each storage tank may at one time or another be the high tank, medium tank or low tank because they are preferably all filled to the same pressure. However, as CNG is dispensed the pressure lowers and the compressor(s) cannot maintain the pressure. Meters 214 and 216 are used to provide feedback (and information to the user, if desired). Meters 214 and 216 are flow meters in the preferred embodiment, but could be other sensors and provide other feedback in other embodiments. Valves 204 and 205 could be open/close valve, proportional valves, or pulsed valves depending on the desired fill schemes. If they are merely open or closed, then they apply the pressure from one of the storage tanks, and the flow is set by pressure differential. Proportional valves can open part way, and be opened to provide any flow up to the maximum (fully open). Pulsed valves are pulsed on and off, and the flow is proportional to the maximum flow multiplied by the percent time they are open (on time/(on time plus off time).

Each dispenser sub-station includes pipes, flexible hoses, nozzles, etc. Three storage tanks are shown. More or fewer tanks could be provided. Valves determine which storage tank is fluidly connected to which dispensing hose. The fluid flows in a controllable fluid path from the tank to the hose. A controller controls the various valves and receives the feedback from the meters.

This invention may be used with other alternative fuels, including, biogas (natural gas created from a renewable source such as corn, animal waste, garbage, or the like), LPG (propane) LNG (liquid natural gas), CNG (compressed natural gas), ANG (absorbed natural gas), Hydrogen 20%+ CNG 80% (hythane- or similar % blends), bio-methane, bio-CNG or bioCNG or Biocng, DME (diMethyl ether), hybrid-combo (combinations of the above and/or electric and/or petroleum products, dispensing sub-station).

Data transfer utilizing ethernet or other multi-drop communication systems (wired or wireless) such as OLE, OPC, etc. can be provided between the controller, dispensers, valves, etc. One embodiment version includes communication with the priority panel. This allows a variety of operating modes for any of the devices to be used or selected.

The term "Queuing" (as in the queue) describes one fill scheme wherein when 3 vehicles are already filling and a fourth or fifth vehicle starts filling, the last to arrive vehicles only receive CNG from the "Low" pressure storage tank.

One embodiment provides for a configurable station, wherein a valve or switch, or a user interface allows someone such as the station manager to select which of the features or modes described will be used at any given time. It can be easily changed or reconfigured as needed and as often as the station manager dictates. The configurable station can be configured by a computer program to automatically switch between various embodiments to optimize for any of the following criteria: time of day; number of vehicles refueling; maximum volume output; station profits; minimum station maintenance; user satisfaction; preferred customer satisfaction; preferred credit cards; or the like. It could also store this type of information and suggest additional hardware for station optimization.

Figure 3:
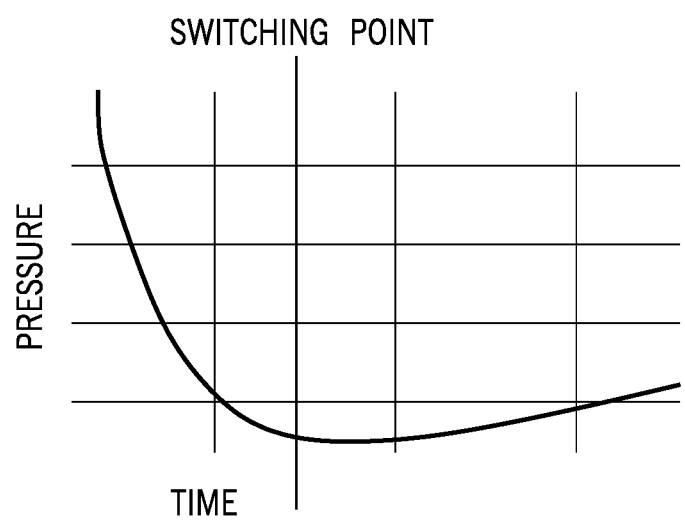
FIG. 3 is a graph showing "PRESSURE" vs. "TIME" for a dispenser and a storage tank.
Figure 4:
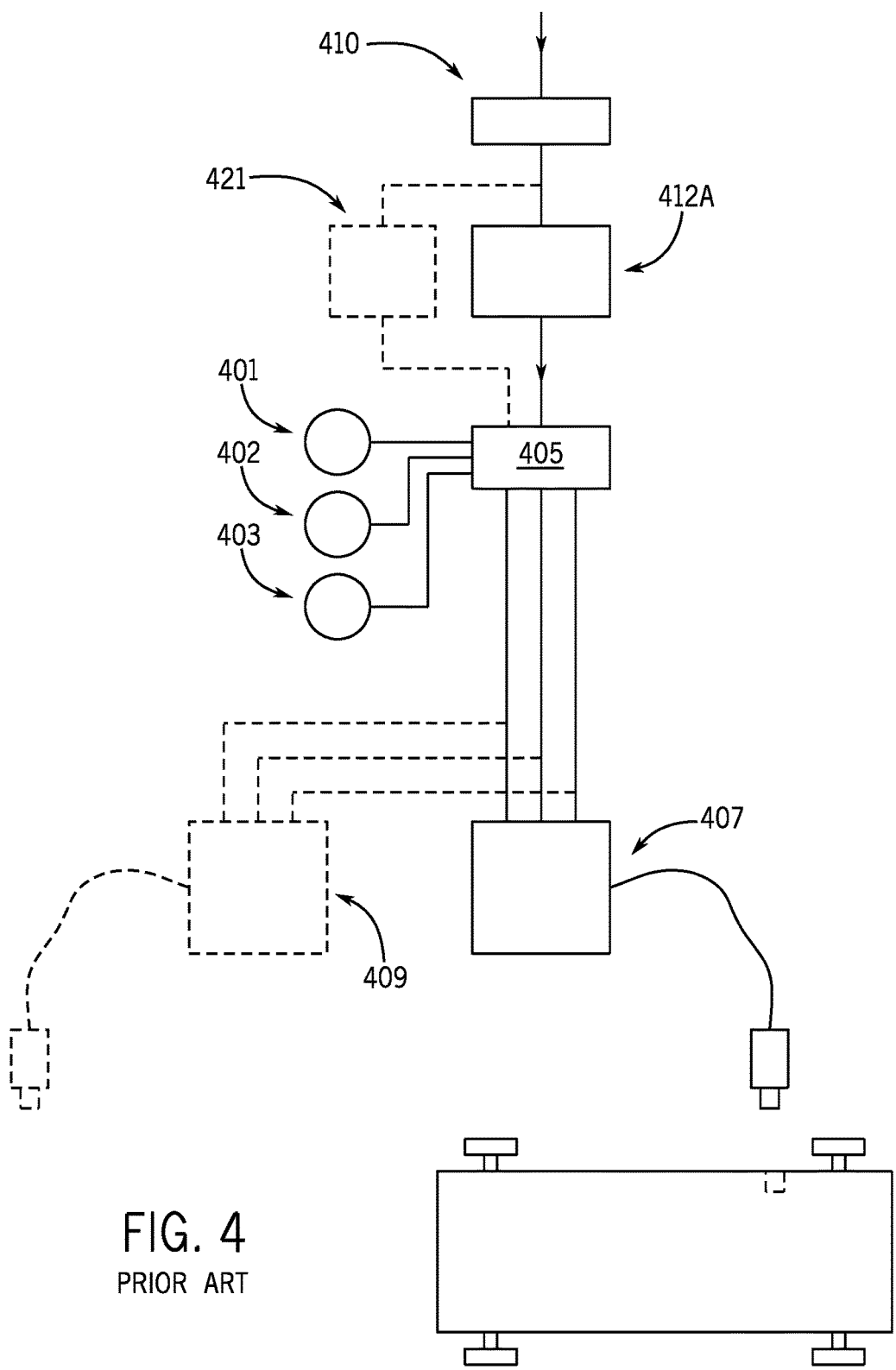
FIG. 4 shows a prior art CNG filling station.

Another embodiment preferably monitors the rate of change of pressure, instead of monitoring the flow rate at the dispenser or at any other location in the flow path. Once the storage tank and the vehicle come to equilibrium, the storage vessel is no longer able to provide any benefit to the process, and actually becomes a hindrance in filling the vehicle quickly. This condition can be detected by monitoring the pressure. Specifically, when the monitored pressure passes the perigee (lowest point), the storage tank in use no longer can fill the vehicle, and the system should switch the dispenser/vehicle to a different storage tank. The slope (rate of change) of the pressure can be monitored, and when the slope approaches or reaches zero, the controller switches to a new tank. FIG. 3 is a graph showing "PRESSURE" on the vertical axis and "TIME" on the horizontal axis, to illustrate why there is a switching point, and where it should occur.

FIG. 3 shows the pressure of one storage vessel, as it delivers its fuel to the vehicle. There is a steep negative slope as the vessel delivers its fuel to the vehicle. Once the vessel pressure and the vehicle pressure are equal, the vessel is no longer able to provide much benefit to the process, and actually becomes a hindrance in filling the vehicle quickly. However, because one or more compressors are running, the dispenser might be satisfied to remain connected to that bank. This prevents the timely switching between banks (and vehicles), and prevents the queue from moving. Thus, rather than switching tanks at a set pressure point, the switch is made when the tank is no longer able to fill the vehicle, or no longer able to fill it at a desired rate.

Another embodiment provides for monitoring the slope of the pressure along with the flowrate threshold method to provide an "either or" method which is more reliable than using flow rate alone. The pressure data could be used in raw form, or modified by averages to smooth the slope out (removing the ripple seen later in the curve from the cycling of the compressors). The "pressure slope" switching threshold could be used as a fixed point, or as the time spent in a "window", to make the switch point more immune to ripple or noise. For instance, if the slope is between 5 and 80 for a period of 10 seconds, then (regardless of flow) that hose would be instructed to switch to the next higher bank. These window values and timer values can either be fixed, or settable parameters which could customize the "pressure slope switch point" to each individual site.

One embodiment calls for improved dispenser communication with the user, such as providing messages along the lines of "Pause"; "Please Wait"; "Limited Flow". "Pause" message is used while CNG flow stops to switch to a different storage tank. "Please Wait" message is used at the dispenser while the gas flow is diverted away from their dispenser to a different dispenser. The diversion can be initiated by the dispenser or the priority panel in accordance with the desired fill scheme, the "Limited Flow" message is used to explain to the user why ifs taking unusually longer than expected to fill their vehicle that day.

A gas flow meter (volume per unit time) is preferably provided at the dispenser or hose assembly to improve customer perception of amount of gas they are getting. Prior art gauges showing units in psi (pounds per square inch of pressure) along with price per GGE can be confusing, and can fail to properly account for gas temperature.

The CNG fill rate can be improved using the schemes and designs described herein. For example, heat exchanger fins on the storage vessels or gas lines help cool the gas faster and help minimize gas shrinkage after CNG is in the user's vehicle. Improved laminar flow of gas by using larger internal port dimensions or less disruptive valves in the dispenser nozzle and hose assembly can increase flow from 12 GGE up to about 30 GGE with one hose. Allowing and encouraging a user to fill their vehicle with two hoses simultaneously by adding special valves and/or ports (FIG. 1) can to double the flow rate into vehicle.

Improved "laminar flow" or "constant flow through hose assembly" of gas is preferably implemented with larger internal port dimensions in the dispenser nozzle and hose assembly to increase flow from today's typical 12 GGE up to and beyond 30 GGE (Gasoline Gallon Equivalent) with one hose, and by using less disruptive safety check valves. The prior art design and size is similar to diesel nozzles, but in matching the outer dimensions the inner port dimensions suffered and were minimized. The internal port orifice size at the break-away hose safety feature and at the nozzle valve safety feature is a limiting bottleneck for increasing flow. The safety features requires the dispenser to recognize a back pressure from a vehicle of at set amount (typically 100-300 psi) to insure a vehicle is truly connected before CNG flow is allowed down the hose to the nozzle and to the vehicle.

Prior art designs follow international standards such as ISO 14469-1:2004(E) section 5, 6, and 7. The orifice diameter is 7.8 mm (0.31") plus further flow restrictions from a spring loaded safety closing device. The deceiving outer dimensions of these receptacle mating parts and related rubber hose gives the impression the inside diameters are close to 25 mm (1.00") but they have 2-3 critical flow restriction points that cause the gas to slow down, become turbulent, heat up greatly, and cause a bottle-neck for the entire refueling station. By eliminating these restrictions in the hose assembly the flow to the vehicle can be increased by 2-3 times prior art rates.

The receptacle on the vehicle could also be replaced with a part having larger inside diameter to help optimize maximum flow potential. Sub-components preferably have a larger inside diameter and resulting larger outside dimensions. The spring loaded check valve is also part of the flow problem because as the dispenser gas pressure approaches the vehicle tank pressure there is a smaller pressure differential which causes the check valve to start closing long before the refueling is complete. Other check valves may be used (see the description of FIG. 24 below), or a spring valve that does not close prematurely may be used.

One embodiment of a nozzle includes a nozzle assembly that has one or more motors, electric solenoids, pneumatic actuators, physical manual motions of a lever, or the like to sequentially lock mating parts together; then confirm back pressure from vehicle is present; then open and hold safety check valve wide open; and then allow full flow through hose assembly. The process would be automatically reversed before nozzle is unlocked from vehicle. The nozzle preferably has an outwardly similar lever for the operator to use but inside would incorporate stepped logic functions (see the description of FIG. 23 below). Redundancy could increase safety level.

Figure 5:
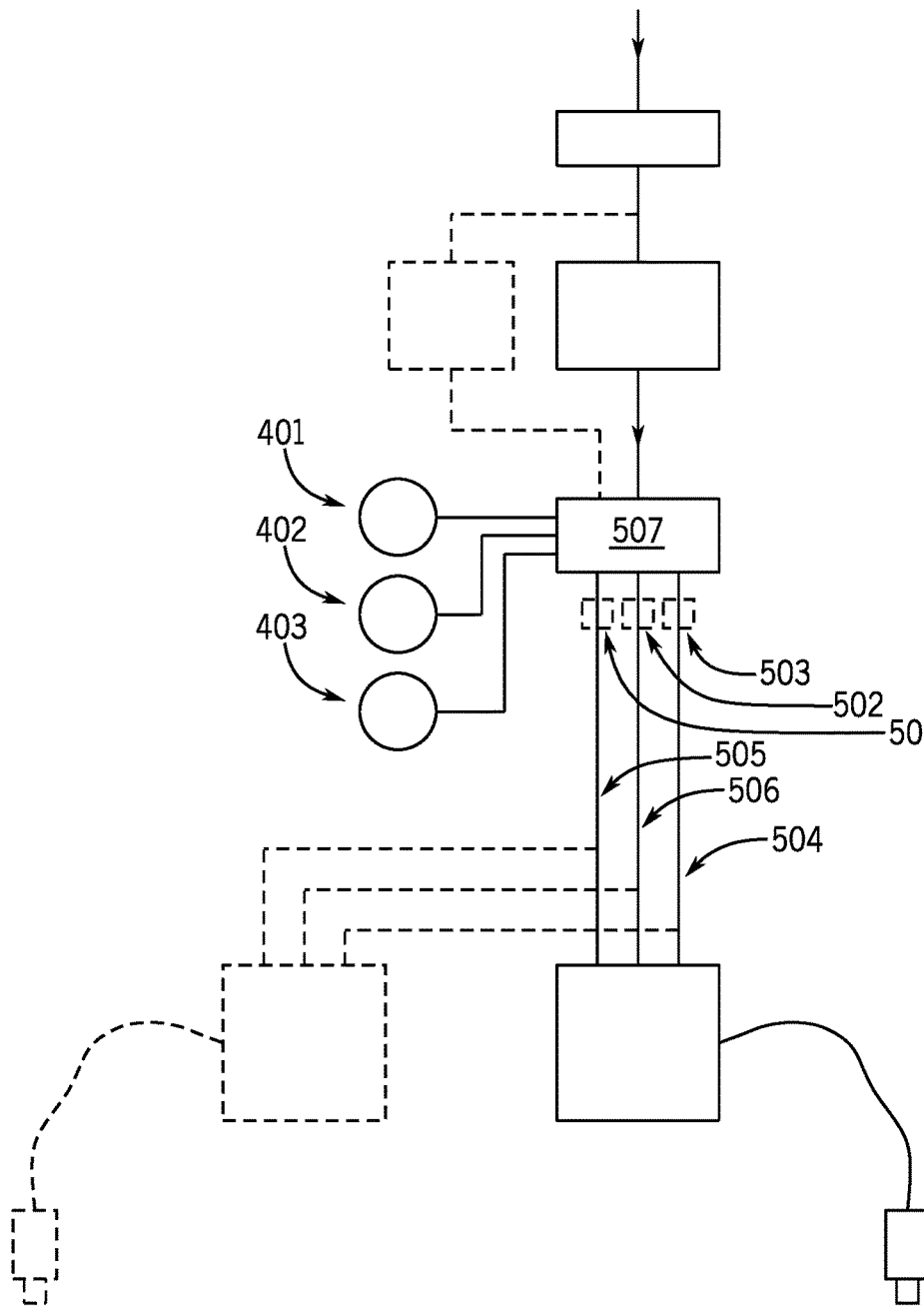
FIG. 5 shows a system with proportional valves.

A station that can implement various fill schemes is shown in FIG. 5, and includes proportional control valves 501-503. Three lines 504-506 are provided between priority panel 507 and dispenser 407, and each line includes one of control valves 501-503. Each line is connectable to one of storage tanks 401-403 by priority panel 507. By proportionately opening the valves, the flow rate may be controlled. More than 3 pressure vessels could be used. Three valves cannot control how many vehicles are feeding off each line so additional communication with the dispensers could be provided to aid in implementing the desired fill scheme, as in embodiments described below. Alternatively, valves 501-503 could be pulsed as described below with respect to other valves.

Figure 6:
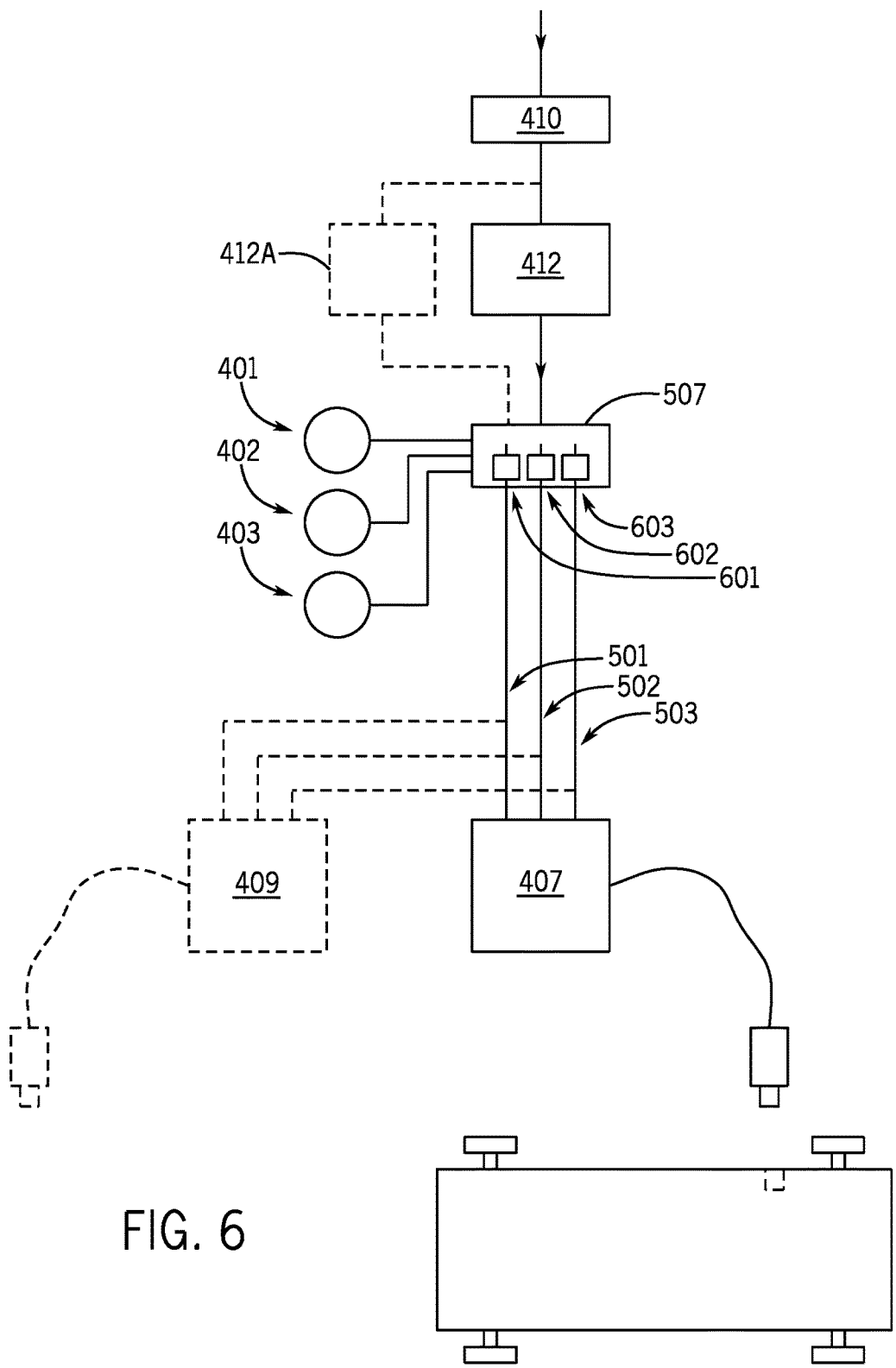
FIG. 6 shows a system with pulsed valves in the priority panel.
Figure 7:
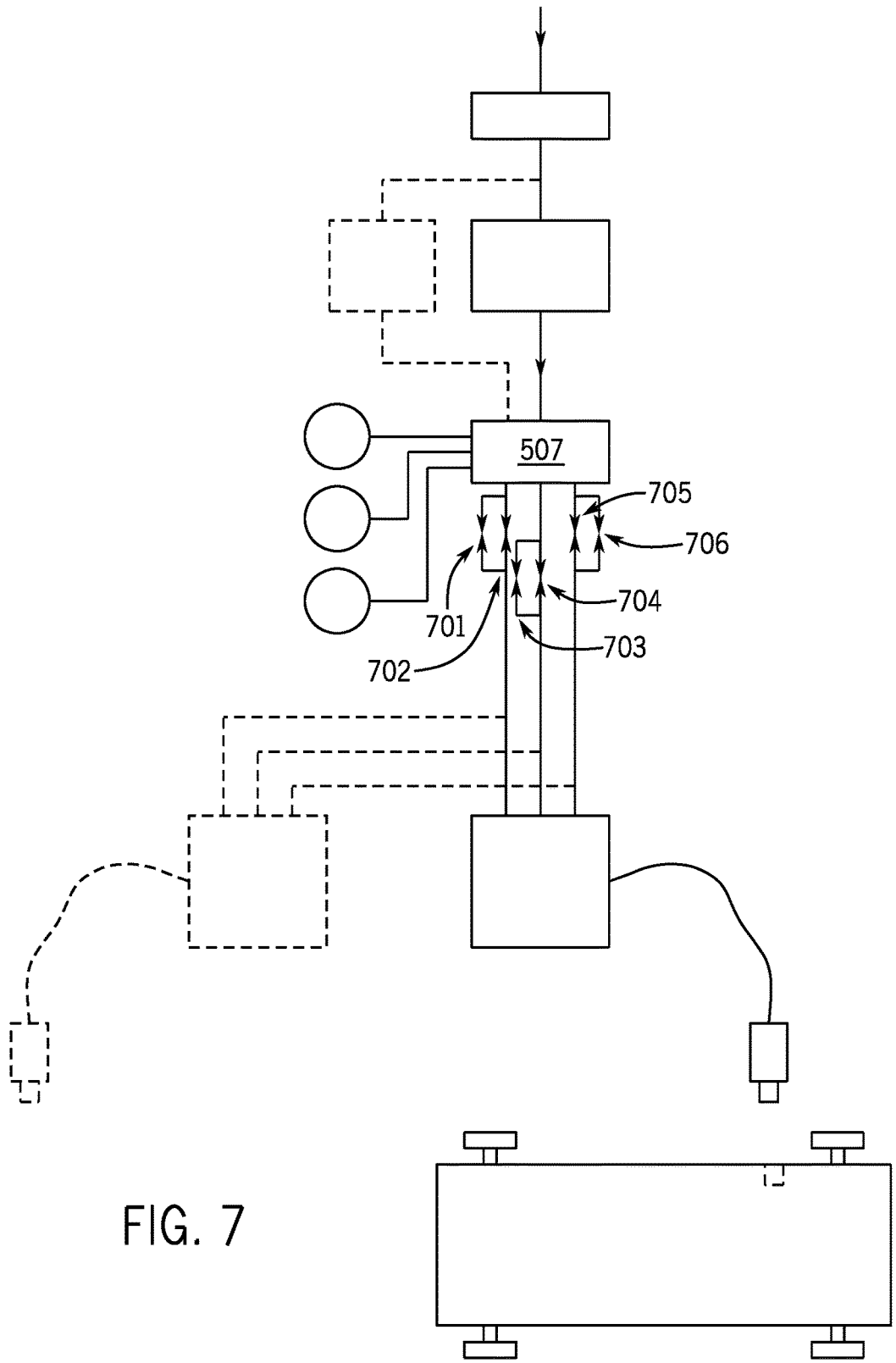
FIG. 7 shows a system with parallel valves.

FIG. 6 shows prior art valves 601-603 in the priority panel. However, the prior art merely turned these valves on or off One embodiment calls for pulse width modulating these valves to simulate proportional valves. Proportional control valves can be simulated by pulsing the existing on/off solenoid valve in such a way as to provide a desired flow rate. Proportional control valves can also be simulated by utilizing parallel solenoid valves, flow controls, or flow restrictors to achieve a desired net flow rate downstream. Valves 701-707 in FIG. 7 are parallel valves that can simulate proportional control. Each parallel valve can increase the number of possible flow rates. These alternatives may be lower cost than proportional valves.

Figure 8:
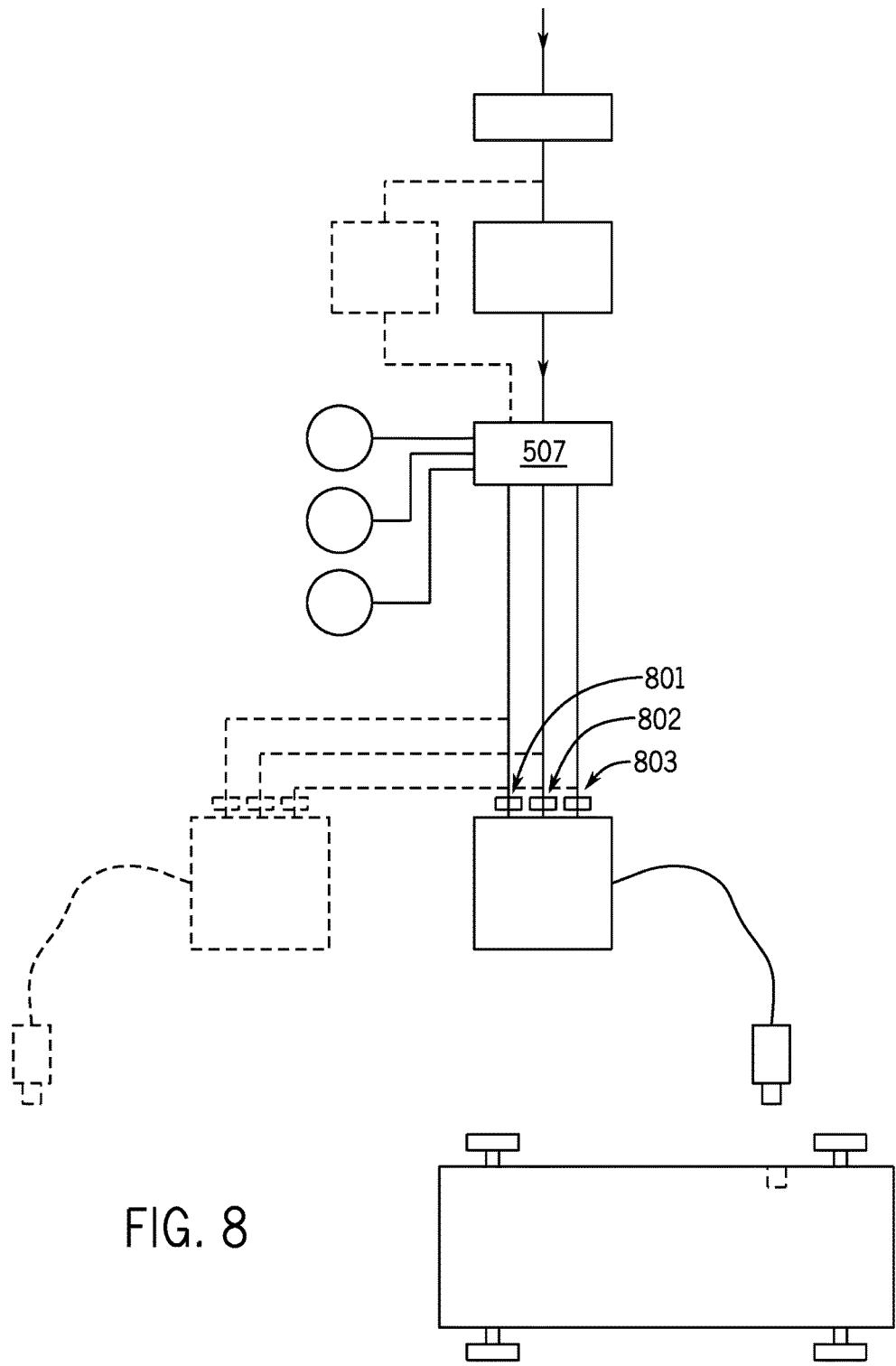
FIG. 8 shows a system with proportional valves near a dispenser.

FIG. 8 shows another arrangement with valves 801-803 located near dispenser 407, wherein they are in a flow path that includes only dispenser 407. Other dispensers have similar valves associated therewith. Valves 801-803 are proportional valves, but can be pulsed valves or parallel valves in alternative arrangements.

Figure 9:
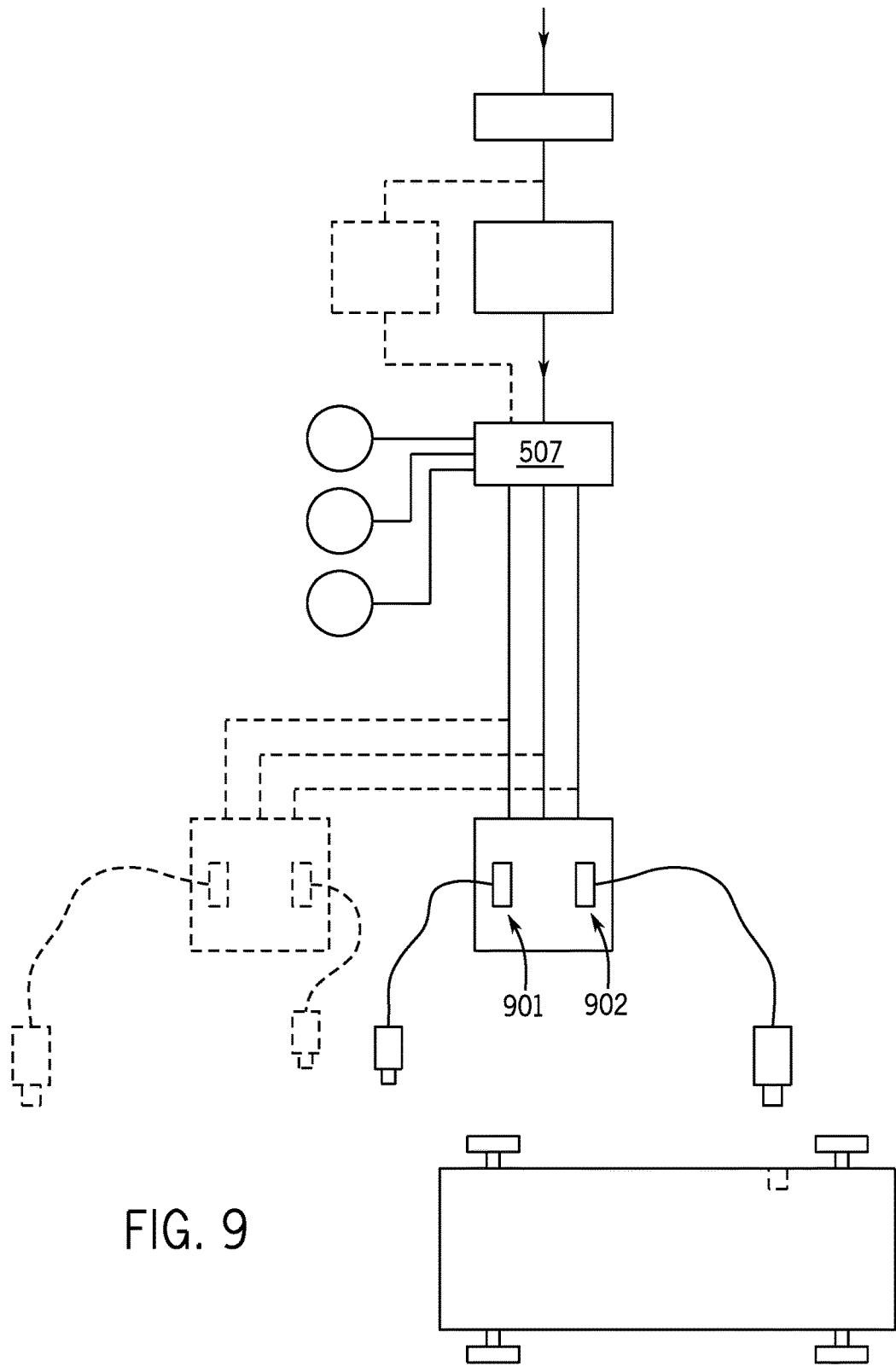
FIG. 9 shows a system with proportional valves in a dispenser.
Figure 10:
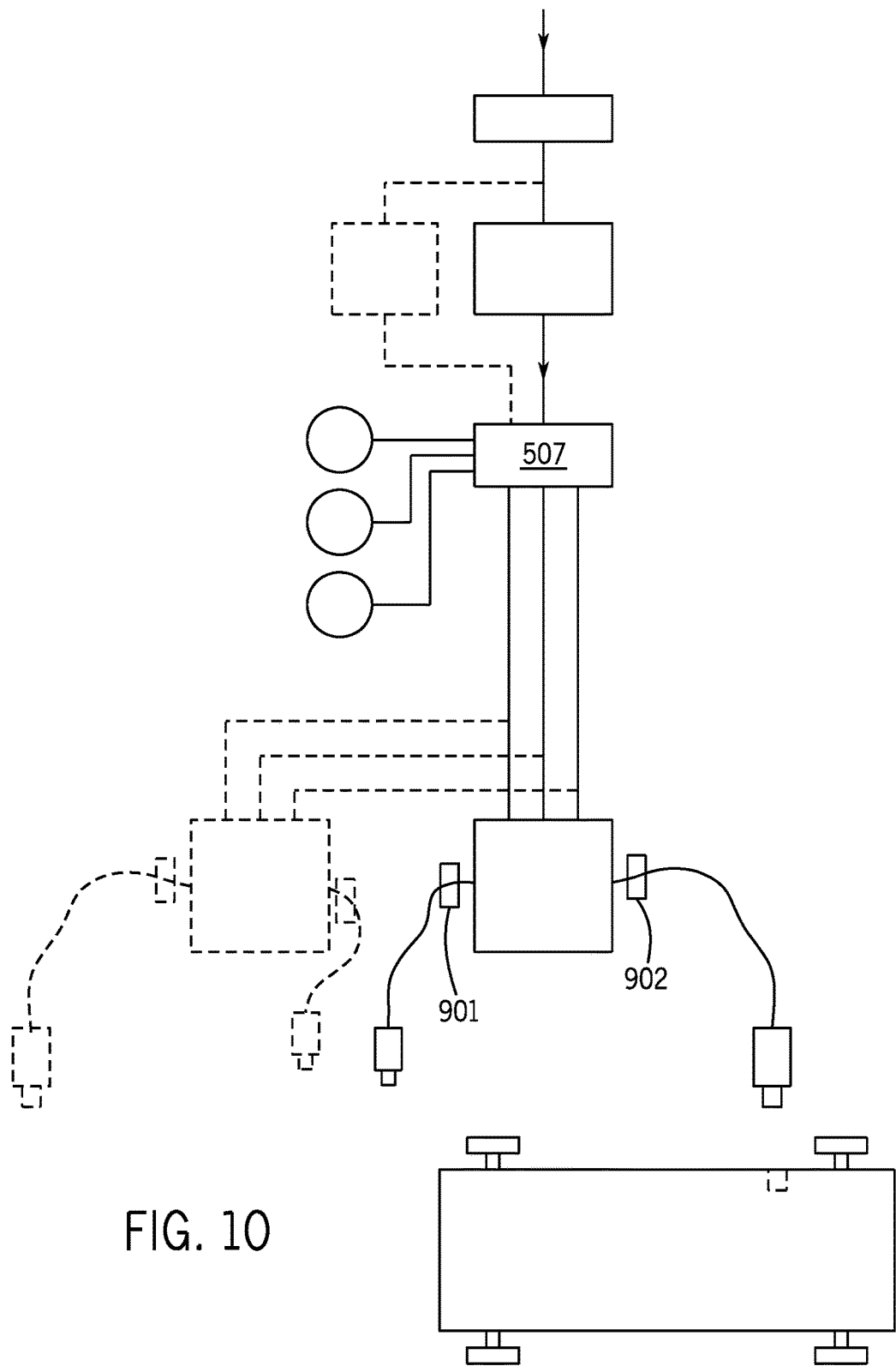
FIG. 10 shows a system with proportional valves near nozzles.
Figure 11:
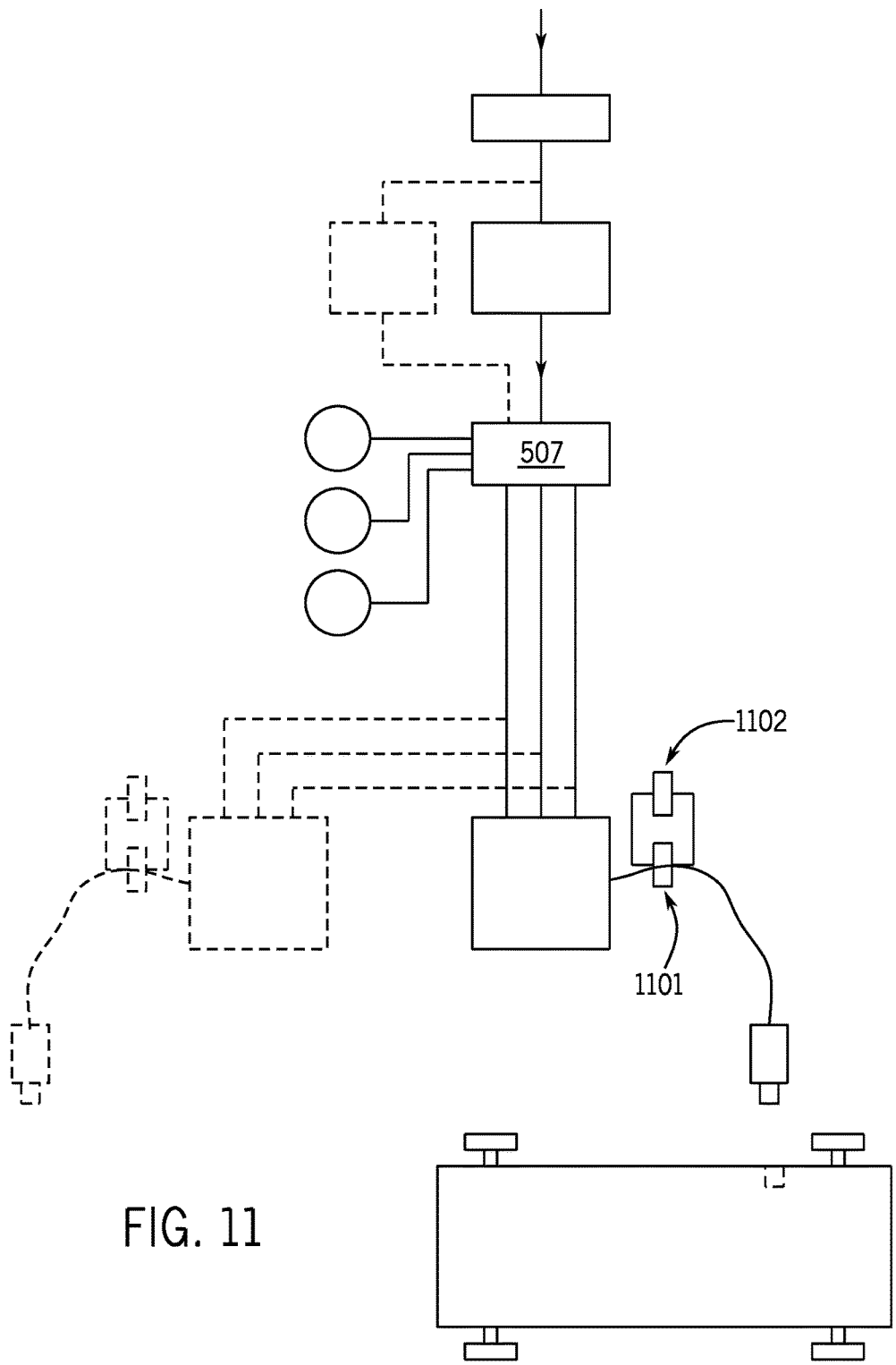
FIG. 11 shows a system with parallel valves near the nozzle.

FIG. 9 shows another arrangement with proportional valves 901 and 902 inside dispenser 407. There are two nozzles for dispenser 407, and each nozzle has a proportional valve associated therewith can be used (either provided by dispenser manufacturer or add-ons) to control flow uniquely to each of the 2 hose/nozzle assemblies. FIG. 10 shows a similar arrangement, but valves 901 and 902 are located between the dispensers and each of the 2 hose assemblies. Valves 901 and 902 are pulsed valves or parallel valves in alternative arrangements. FIG. 11 shows on/off valves 1101 and 1102 in parallel.

Figure 12:
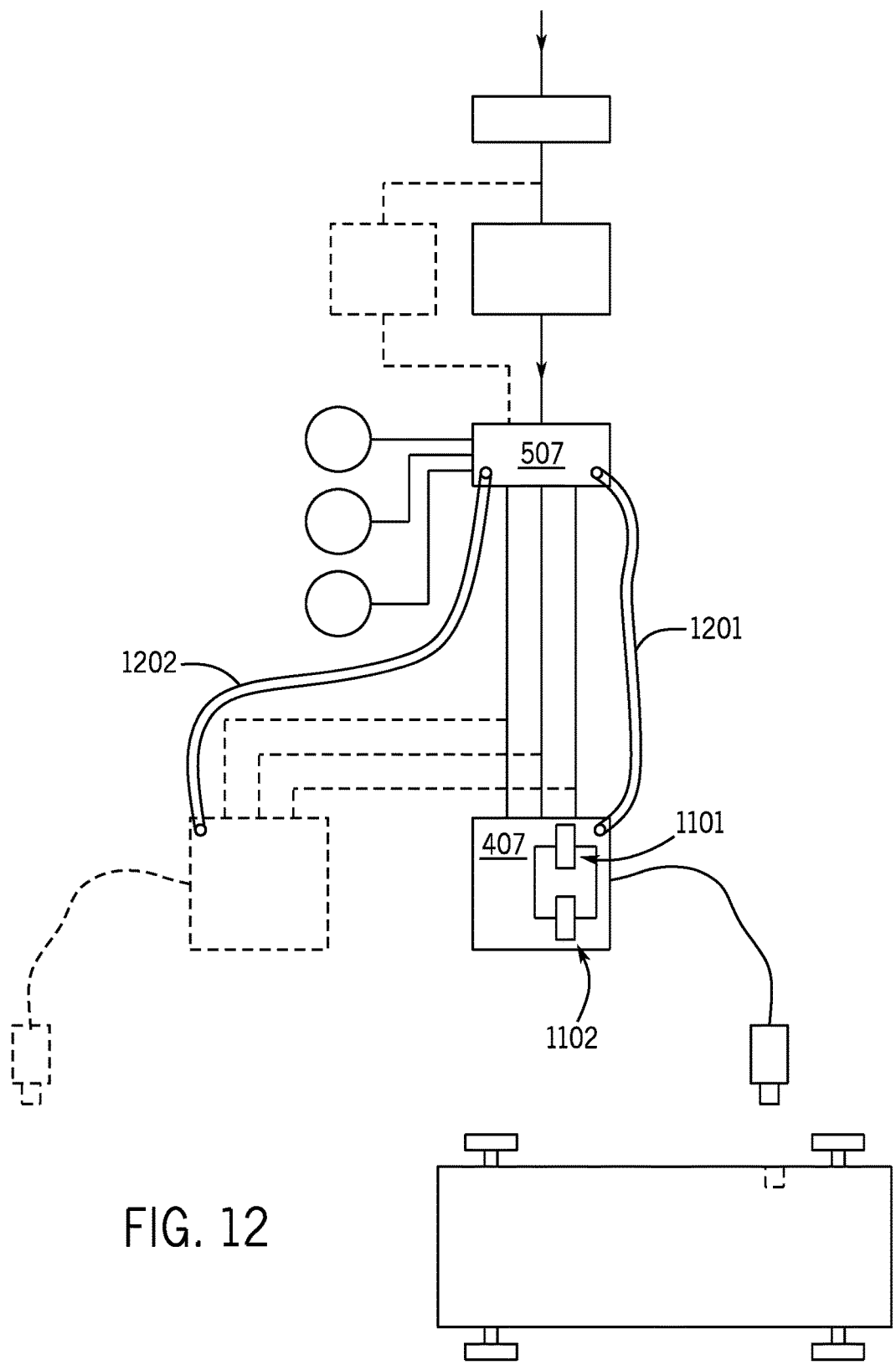
FIG. 12 shows a system with parallel valves in a dispenser.
Figure 13:
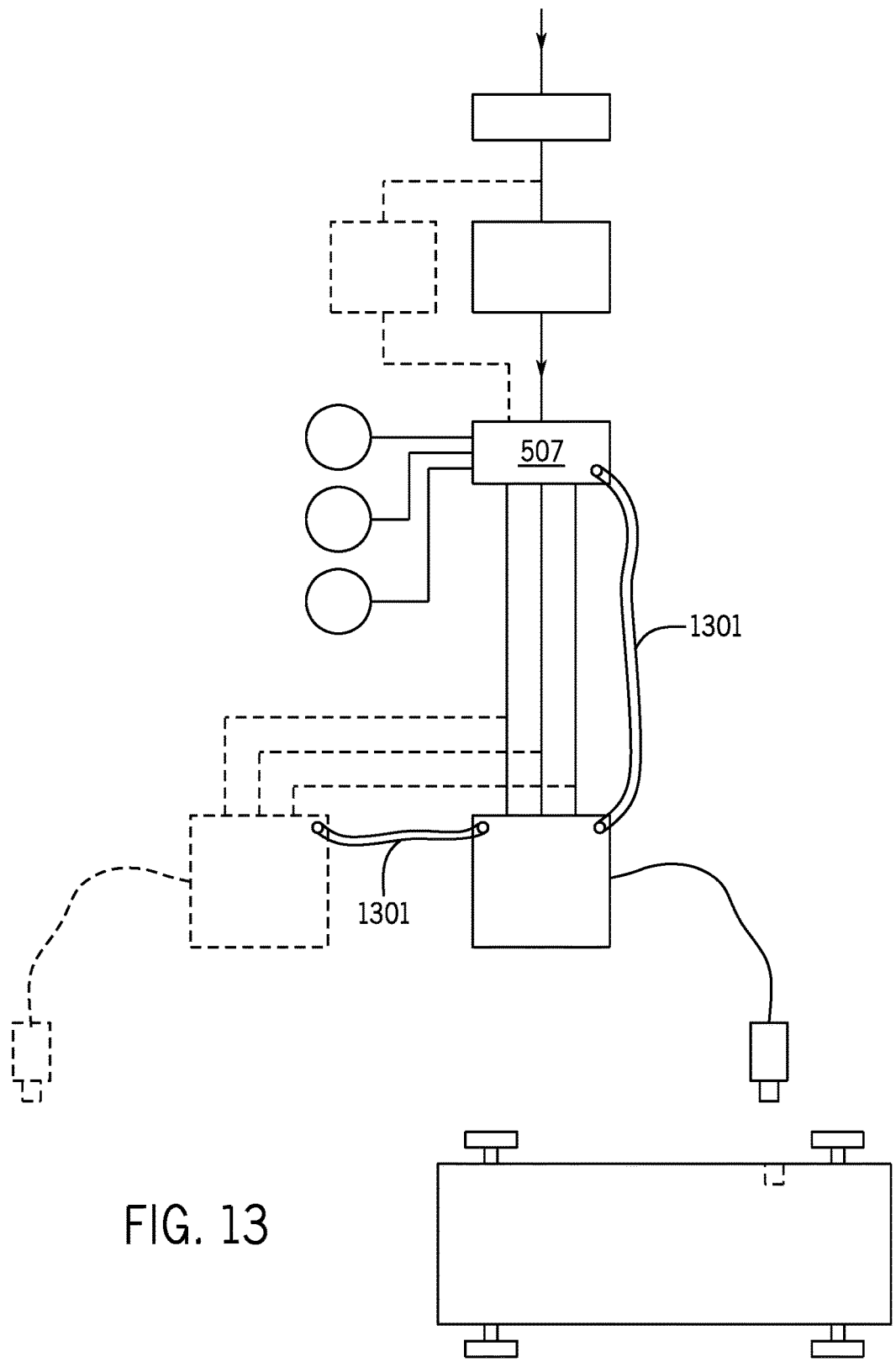
FIG. 13 shows a system with an ethernet.

FIG. 12 shows a system with parallel valves, in dispenser 407. Two communication links 1201 and 1202 provide a direct connection for communicating between the controller and the valves and/or sensors. Alternatives use wireless communication, or other hard wired network protocols. FIG.

13 shows a system with an ethernet 1301 for communicating between the controller (located in priority panel 507) and the valves and/or sensors. Alternatives use wireless ethernet, or other hard wired network protocols.

Ethernet type communications is preferably used between the controller and all pumps and for all filling hoses. Some embodiments includes communication with the priority station. This would easily allow a variety of operating modes for any of the devices to be used or selected. This could also trigger a dispenser to display a "wait" message to the user (either from other dispensers or from the priority station). The dispensers can share a block of memory, which shows what bank each hose is pulling from, and when that hose switched to it (First-In-First-Out). If a bank is currently "in use" by a hose, then no other hose is allowed to switch to it until their pressures are equal. At that point, the two vehicles could fill together, or (if the next bank is free) the first vehicle gets bumped up to the next bank. The controller can be centrally located (remote or nearby), or distributed amongst the various dispensers/pumps.

Other types of communication protocol methods that could be used instead of Ethernet include: Internet of things (Iot); wireless; USB universal serial bus; firewire; MIDI; eSATA; thunderbolt; http protocol; R5232 or R5422 serial communication; or the like. The selected protocol should preferably have robust performance where there is potential risk of interference from nearby motors, engines, and magnetic fields.

As an example of implementing a fill scheme, if a priority fill is called for by the controller (in response to a priority customer being identified) then the priority vehicle would be kicked up to the next bank or tank before any other hose, even if they were not next in line. The dispenser would not terminate a sale even if they were put "on hold", even if there was no flow. In this way every vehicle would get a full fill and would get fuel as rapidly as possible. The dispensers keep track of the queue and regulate what order the vehicles fill. This implements a distributed control system.

Whatever control scheme and arrangement of valves, etc. is used, care should be taken that any dispenser or priority controllers do not "fight" with the controllers described herein. The dispenser low bank solenoid valve could be moved to the actual low bank line and not use it as only the ESD valve.

Figure 14:
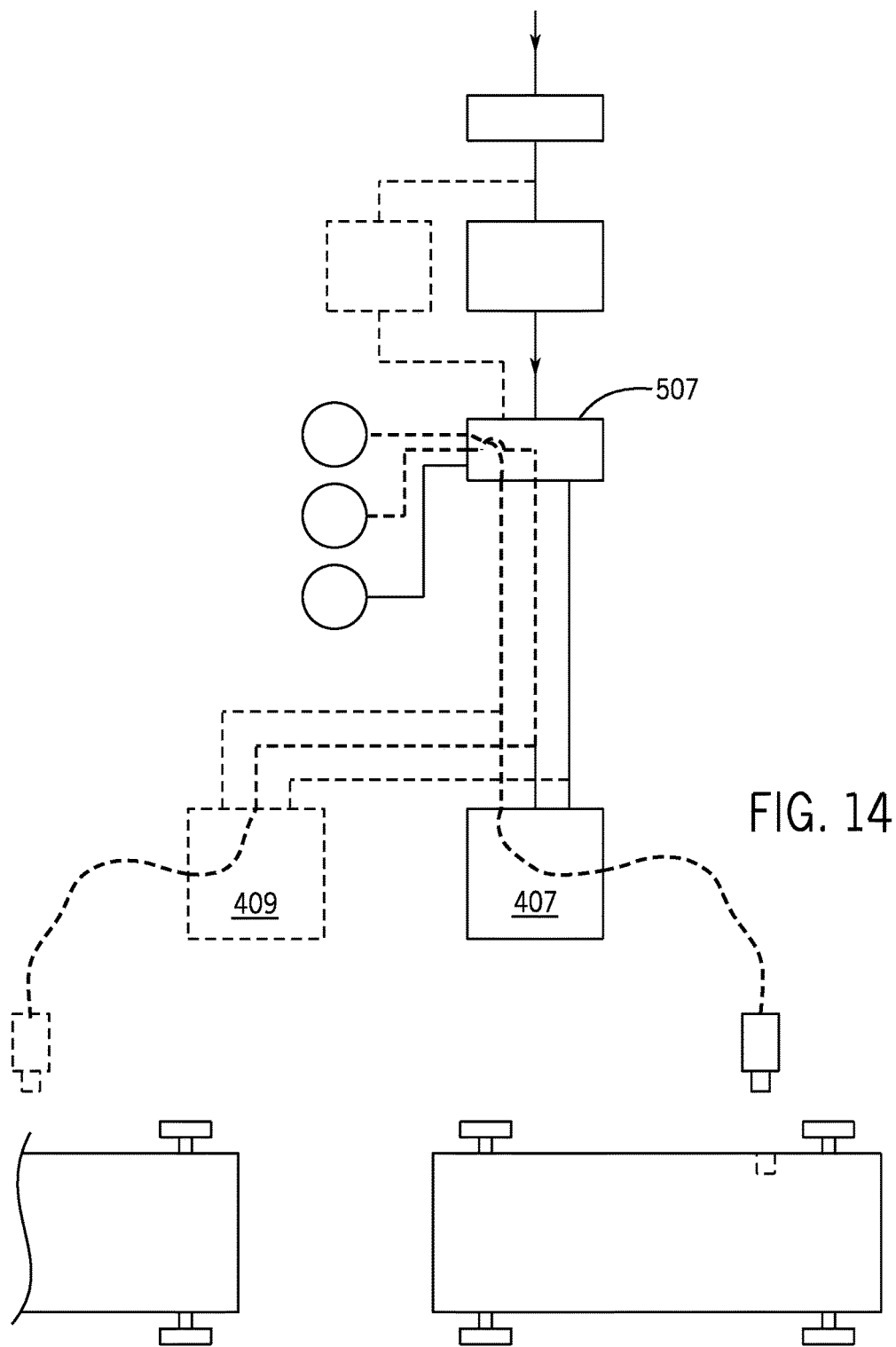
FIG. 14 shows a system with two customers having differing priorities.

FIG. 14 shows a system where the customer at dispenser 407 has priority, and the valves in priority panel 507 are controlled to provide dispenser 407 with the high flow rate (from the highest pressure tank 401). The tanks are called high, medium and low, but in practice, any one may be the highest pressure tank, and as a tank is drained, the high pressure tank can become the medium or low pressure tank. The controller can monitor pressure and adjust valves to connect whichever tank has the highest pressure to the desired dispenser, and change the valves as needed to maintain the desired priority. The medium pressure tank is connected to provide gas to dispenser 409.

Figure 15:
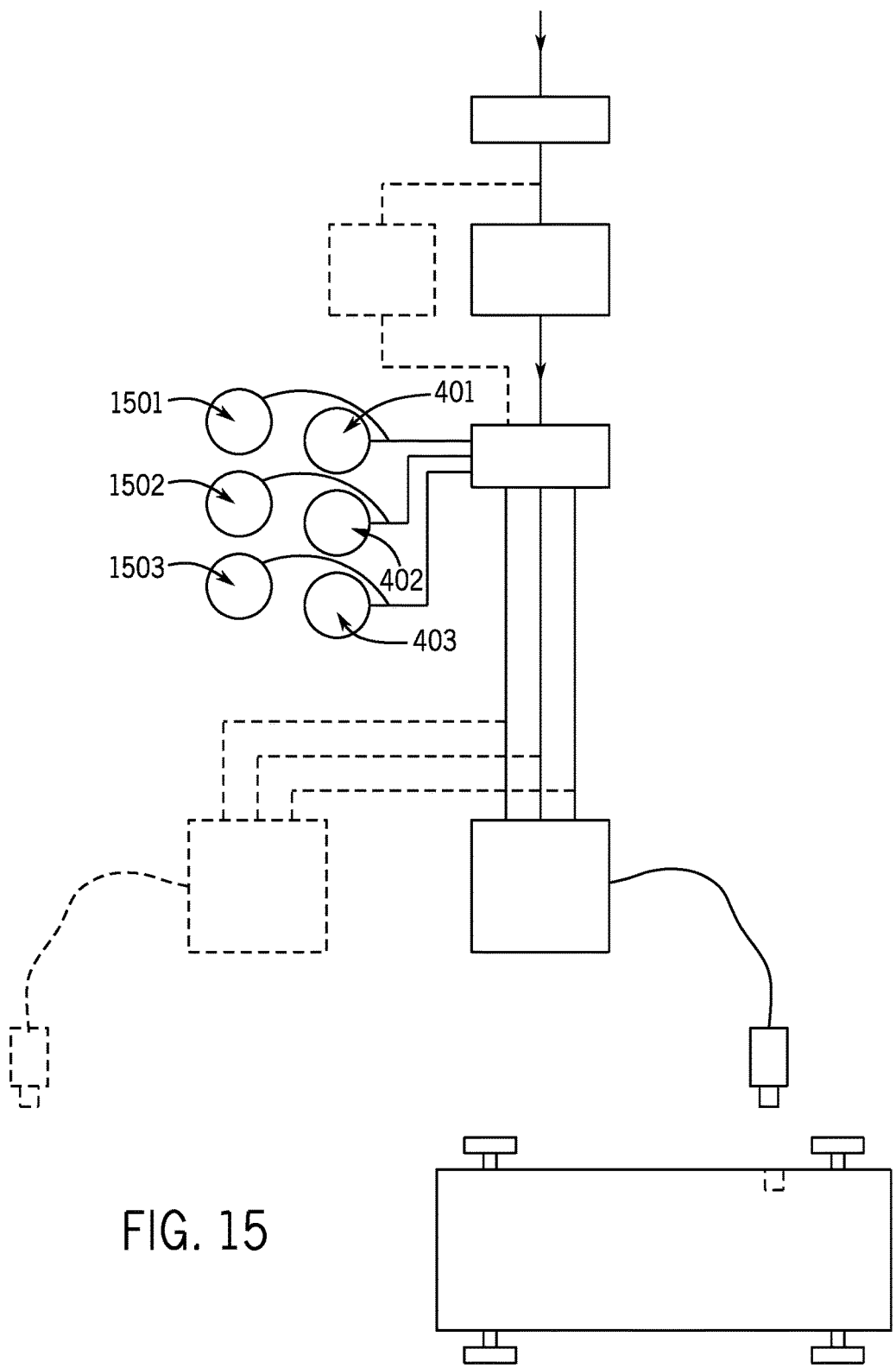
FIG. 15 shows a system with parallel storage tanks.

FIG. 15 shows an embodiment where there are three sets of parallel storage tanks (401-403 and 1501-1503). Two parallel tanks are shown, but more than two could be used. Parallel tanks give greater capacity. Valves could be used, but are not required, to make the second tank "on demand."

Figure 16:
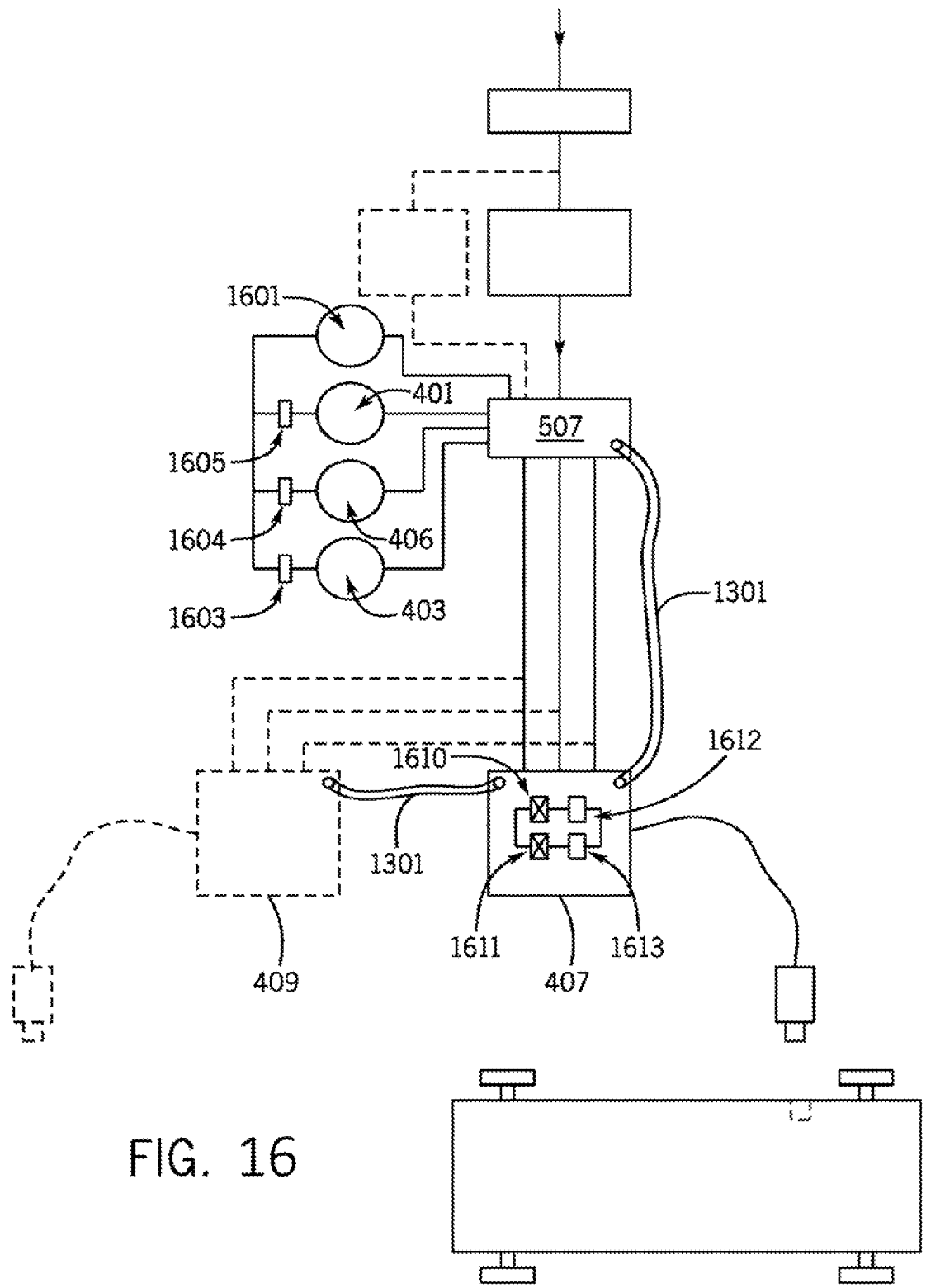
FIG. 16 shows a CNG station in accordance with a preferred embodiment.
Figure 17A:
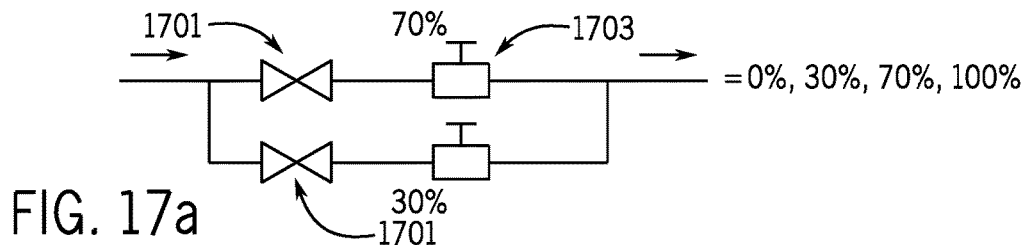
FIG. 17 shows various parallel valve arrangements.
Figure 17B:
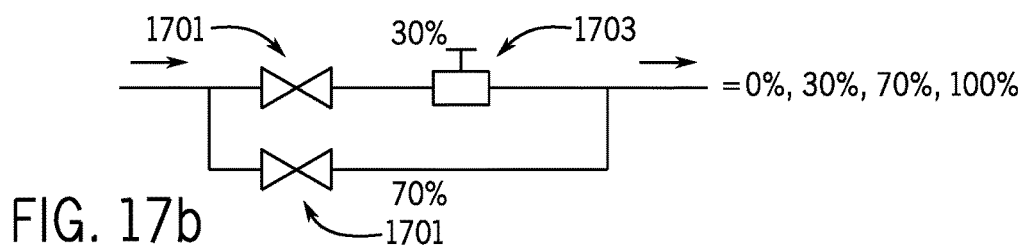
Figure 17C:
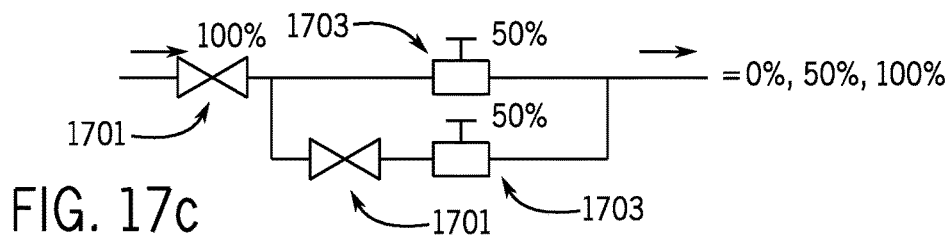
Figure 17D:
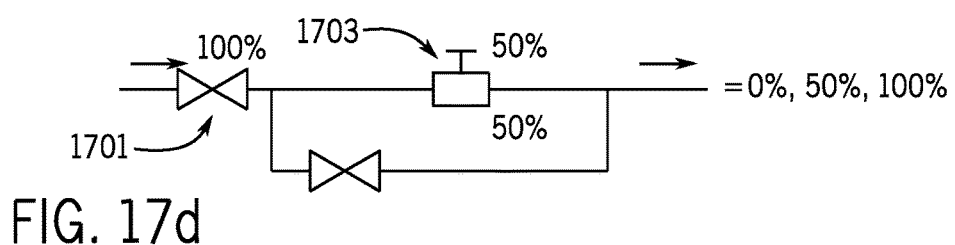
Figure 17E:
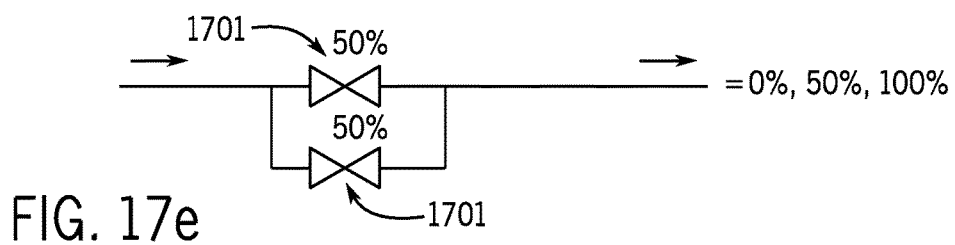
Figure 17F:
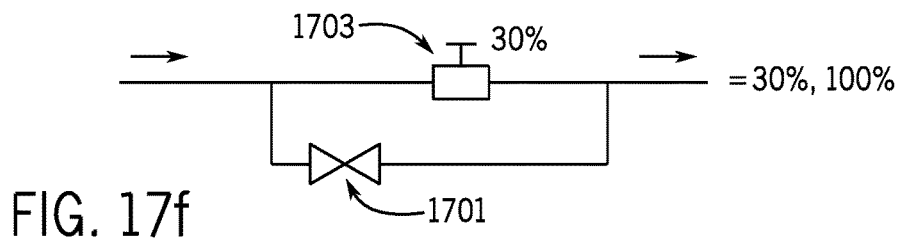

FIG. 16 shows a preferred embodiment with a buffer tank 1601. Valves 1603-1605 controllably connect storage tanks 401-403 to buffer tank 1601. Buffer tank 1601 provides additional gas at a desired pressure to or from any of tanks 401-403 by controlling valves 1603-1605. The gas from tank 1601 can replenish tanks 401-403 faster than possible using only a compressor. Controllable valves 1610-1613 in dispenser 407 allow the fill rate at dispenser 407 to be controlled. Dispenser 409 (and other dispensers not shown) can have similar valves. Ethernet 1301 provides communication between dispensers 407 and 409 (and the valves therein), and priority panel 507.

FIGS. 17*a-f* show various parallel valve arrangements. These arrangement could be used in any of the parallel valve alternatives, and/or in combination with pulsed valves. By mixing and matching various valves, different flow rates could be available. Valves 1701 are preferably electric solenoid actuated on/off valves. Flow restrictors 1703 can have a fixed flow or can be manually adjusted.

Figure 18:
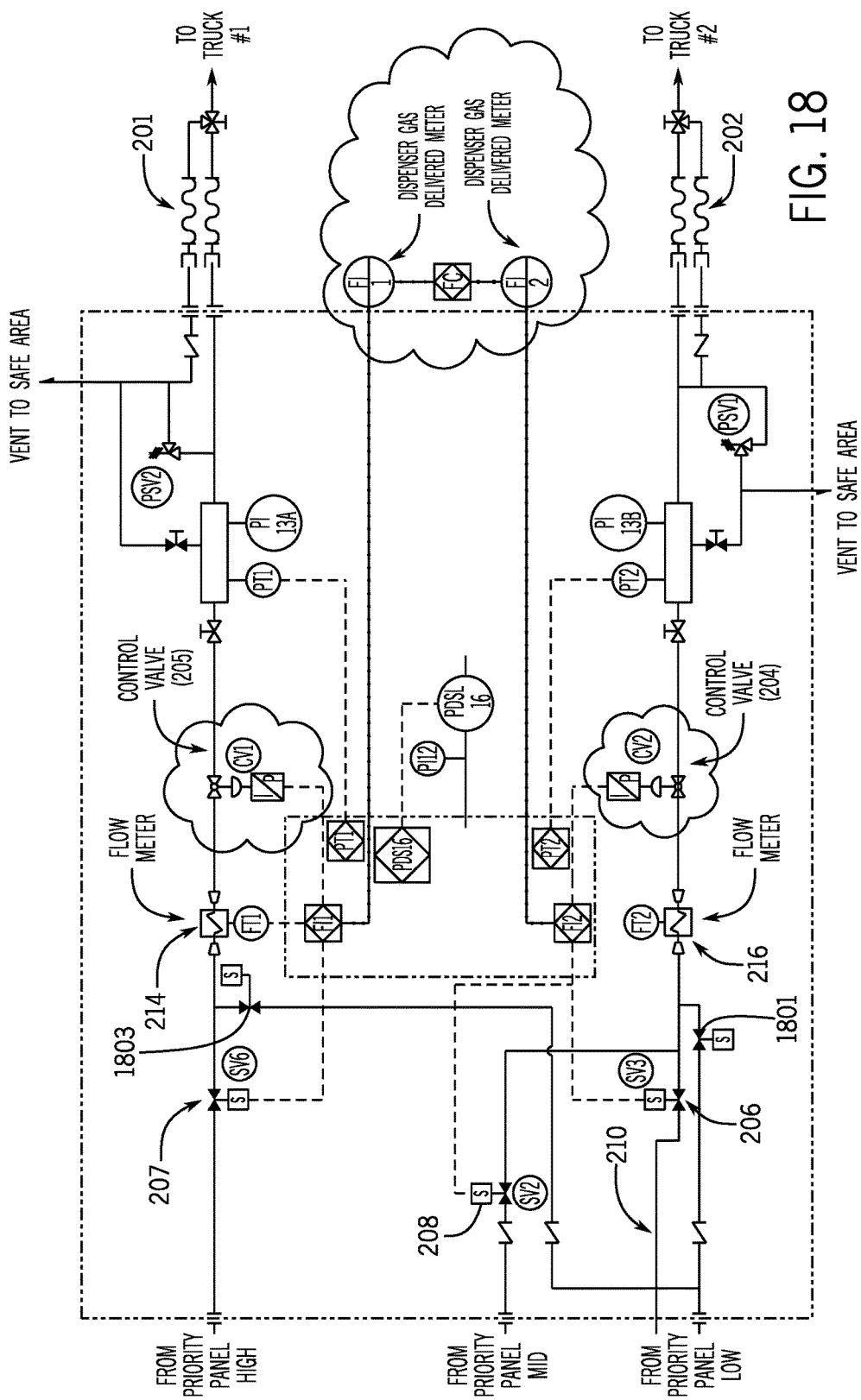
FIG. 18 shows a dispenser.

FIG. 18 shows a dispenser similar to that of FIG. 2, but implementing the flow control with parallel valves.

Figure 19:
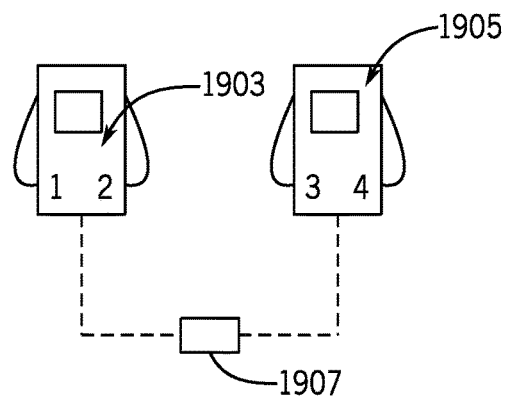
FIG. 19 illustrates queuing trucks.

FIG. 19 illustrates queuing vehicles. A dispensers 1903 has hoses one and two, and a dispenser 1905 has hoses 3 and 4. A communication link 1907 communicates with the dispensers, and time stamps when a vehicle is connected to a hose. The controller uses the time stamp to make sure that fill rates consistent with the chosen fill scheme are provided, based on which vehicles entered the queue first. For example, in one first fill control scheme, when 3 vehicles are already filling (at a 3 storage tank station) and a fourth or fifth vehicle starts filling then valves are controlled such that the fourth and/or fifth vehicle receive CNG from the "Low" pressure storage tank until they become the 3rd connected vehicle to arrive (i.e., earlier arriving other vehicles are filled). This scheme provides that there is never more than one vehicle connected to the "High" tank. There is never more than one vehicle connected to the "Medium" tank. This will help reduce the chance of a vehicle getting cut-off prior to being completely full (3600 psi at 70 degrees F. is considered a Full Fill). One way to implement this mode is using 3 valves (on High, Med, and Low supply lines) prior to each dispenser to minimize changes within standard dispensers.

Figure 20:
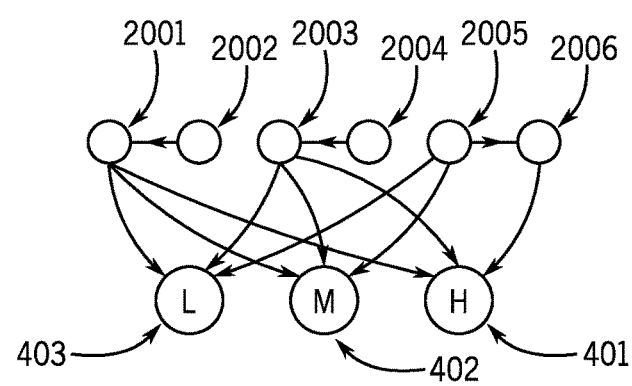
FIG. 20 shows a storage matrix.

An alternative for queuing includes additional communication between the storage vessel control panel and each dispenser using control wiring or Ethernet so 3 extra valves are not needed before each dispenser. The fourth and later vehicles can be given limited flow and/or get no flow, in various alternative first fill schemes. In this scenario, each of the 3 storage tanks could be exclusively filling 1 desired vehicle at a time by holding existing dispenser valves closed for desired hoses. Another alternative provides, instead of the usual three storage tanks, five storage tanks doing "queuing" where the High, Med-High, Med, Med-Low, and Low tanks simultaneously supply gas to their one specific vehicle. Here five underground lines are required from the priority panel to each dispenser. Custom dispensers could be used or standard dispensers could be used with valving for five lines provided to the three standard inlets. Variations could use 4, 5, 6, etc. number of storage tanks. Another alternative provides a storage matrix that has numerous ways to connect numerous storage tanks to numerous vehicles, such as shown in FIG. 20. The connection scheme could vary depending on various factors.

An extra or fourth storage tank could be used to simply double the effective size of the "High" tank volume. Similarly a fifth storage tank could be used to double the effective size of the "Medium" tank. Similarly a sixth tank could be added for the "Low" tank. The tanks can be permanently piped. FIG. 20 shows a storage matrix, where extra tanks 2001-2006 are controllably connected to storage tanks 401-403, to replenish tanks 401-403 faster than would be possible using only a compressor.

Figure 21:
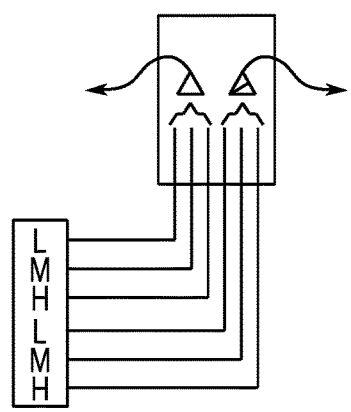
FIG. 21 shows an embodiment with proportional valves.

FIG. 21 shows an implementation with proportional valves 2101 (there are 6 valves—one per line—in one embodiment). Valves 2101 can regulate flow to each vehicle simultaneously, and could be located at the dispenser, at the priority panel, or therebetween.

Figure 22:
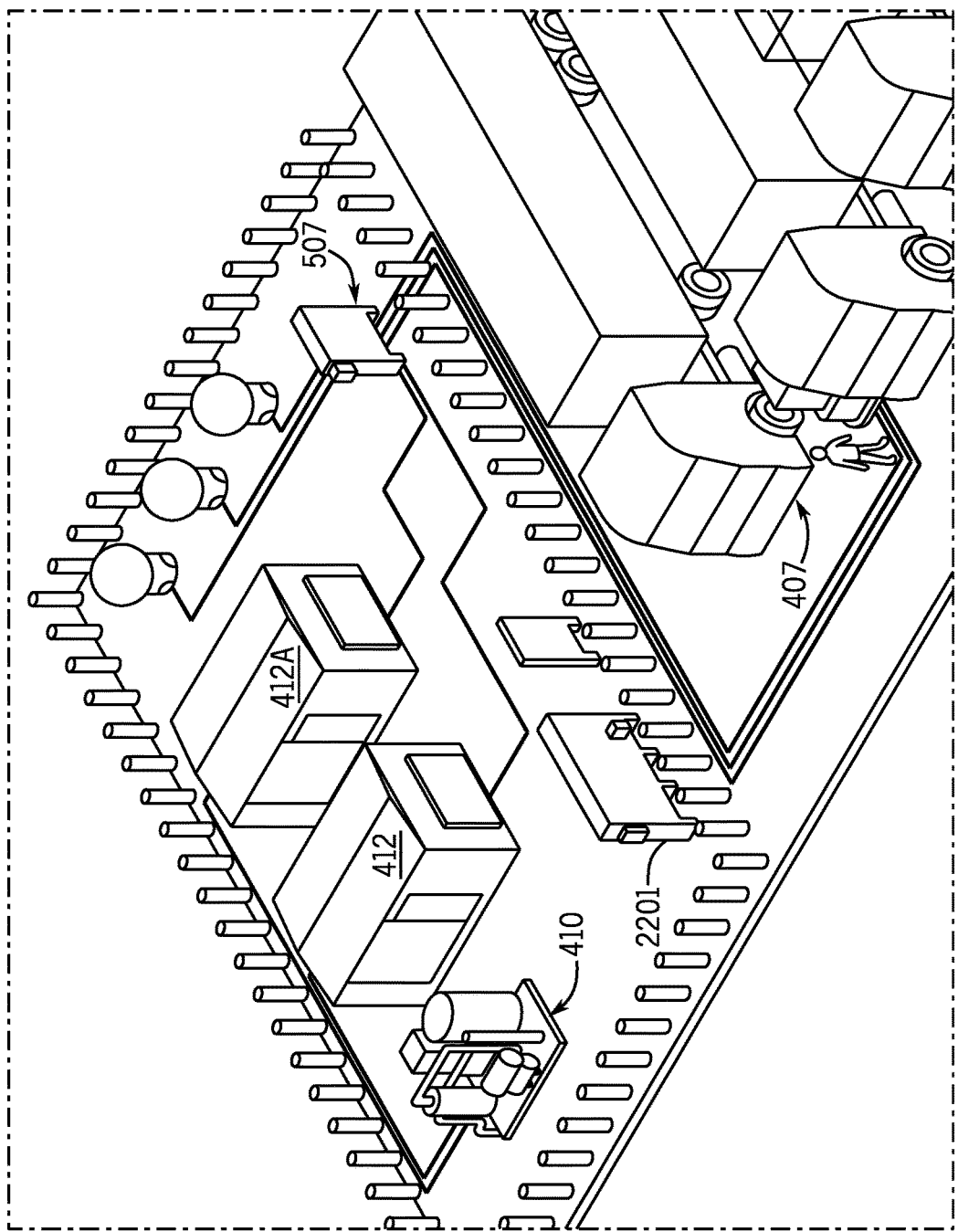
FIG. 22 shows a perspective view of a CNG station.

FIG. 22 shows a perspective view of a CNG station that includes gas dryer 410, compressors 412 and 412A, controller 2201, priority panel 507, and a dispenser 407. The various components could be in accordance with any of the embodiments described herein.

Figure 23:
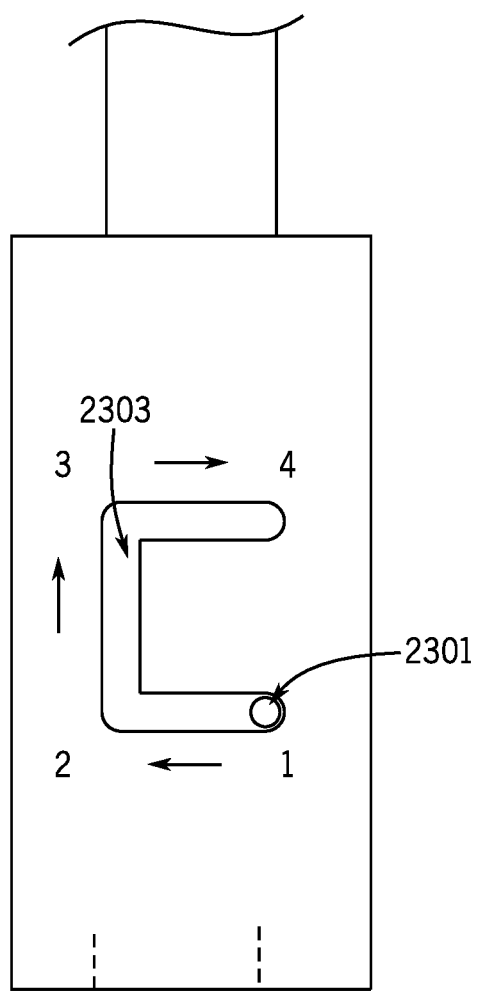
FIG. 23 shows a dispensing nozzle with actuator lever.

FIG. 23 shows a dispensing nozzle with a four position actuator lever 2301 (or activating mechanism). Moving lever 2301 through various positions completes operations needed to dispense CNG. Lever 2301 simplifies the process relative to prior art nozzles. Lever 2301 starts in the home position (1) and the nozzle is inserted into the vehicle to be filled. Then, lever 2301 is moved along a path or track 2303 to a position 2. The action of moving lever 2301 to position 2 causes the nozzle to be locked to the vehicle. Then, lever 2301 is moved in a new direction along path or track 2303 to a position 3. The movement of lever 2301 to position 3 causes a vent to open. Lever 2301 is then moved to position 4 causing a safety check valve to open and gas can fill the vehicle tank. When fueling is completed lever 2301 is moved past position 3 to close the safety check valve. Then, lever 2301 is moved to position 2 to vent the nozzle, and then moved to position 1 to unlock the nozzle from the vehicle.

Figure 24:
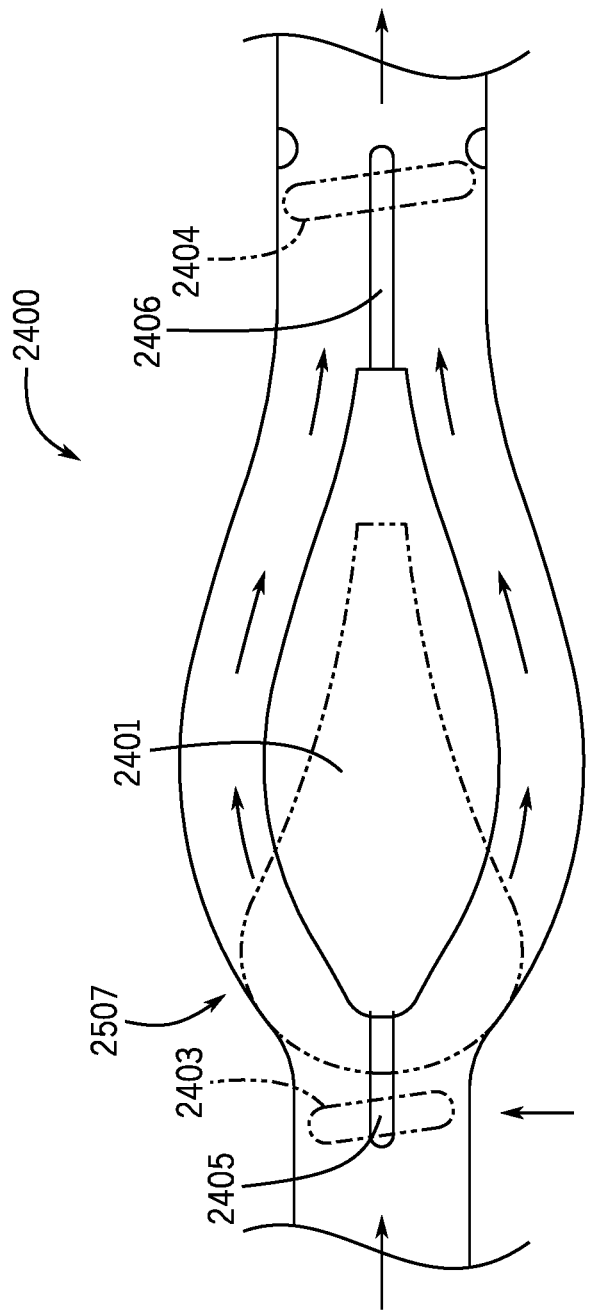
FIG. 24 shows a safety check valve that can be part of a dispenser or on a vehicle.

FIG. 24 shows a non-contact check valve that can be used in the vehicle being filled or used in the dispenser. The valve produces very little turbulence and thus little heating of CNG as the gas flows through the valves. Prior art check valves often include corners and sharp bends that result in turbulence, which heats and expands CNG, and slows the fueling rate. Check valve 2400 includes an air foil shaped stop 2401, shown in the open position in FIG. 24. CNG flows around foil 2401, as shown by the arrows. The flow path is smooth with gentle changes in direction to reduce turbulence. The closed position 2507 is shown with dashed line. Guides 2405 and 2406 at either end of foil 2401 are supported by bearings 2403 and 2404. Bearings 2403 and 2404 maintain foil 2401 in its desired orientation (the center of the gas flow path). Guides 2405 and 2506 slide through bearings 2403 and 2404 as foil 2401 moves between the open and closed positions. Bearings 2403 and 2405 are preferably supported by three struts so as to reduce turbulence. More or fewer struts can be used. One alternative provides for guides 2405 and 2406 to be magnetic, with magnets in the hose supporting the guides to holding foil 2401 in the center of the flow path. This embodiment provides even less turbulence.

Foil 2401 can be biased in the closed position (if so desired) using a spring, gravity, back pressure, or magnets (near the upstream end of foil 2401 and where the hose widens. Foil 2401 moves from the closed to the open position when greater pressure is applied at the upstream end, thus allowing laminar gas flow around the foil in a low turbulence path. Check valve 2400 is preferably in the flow path from CNG source to the vehicle tank to be filled. It can be part of the vehicle, or part of the dispenser.

Before fueling begins, the CNG source is closed off (using an upstream valve). The nozzle is locked to the vehicle, and valve 2400 is closed (2507), either from a bias or because pressure from the vehicle tank is greater than the upstream pressure (with the upstream valve closed). Then, the upstream valve opens, and the gas pressure moves foil 2401 to the open position (shown in FIG. 24), and there is laminar gas flow around foil 2401. When the fueling is over (by pressures being equal or by shutting off an upstream valve) the bias forces foil 2401 back to the closed position. The bias can be gravity, magnetic, spring, or any other bias.

Figure 25:
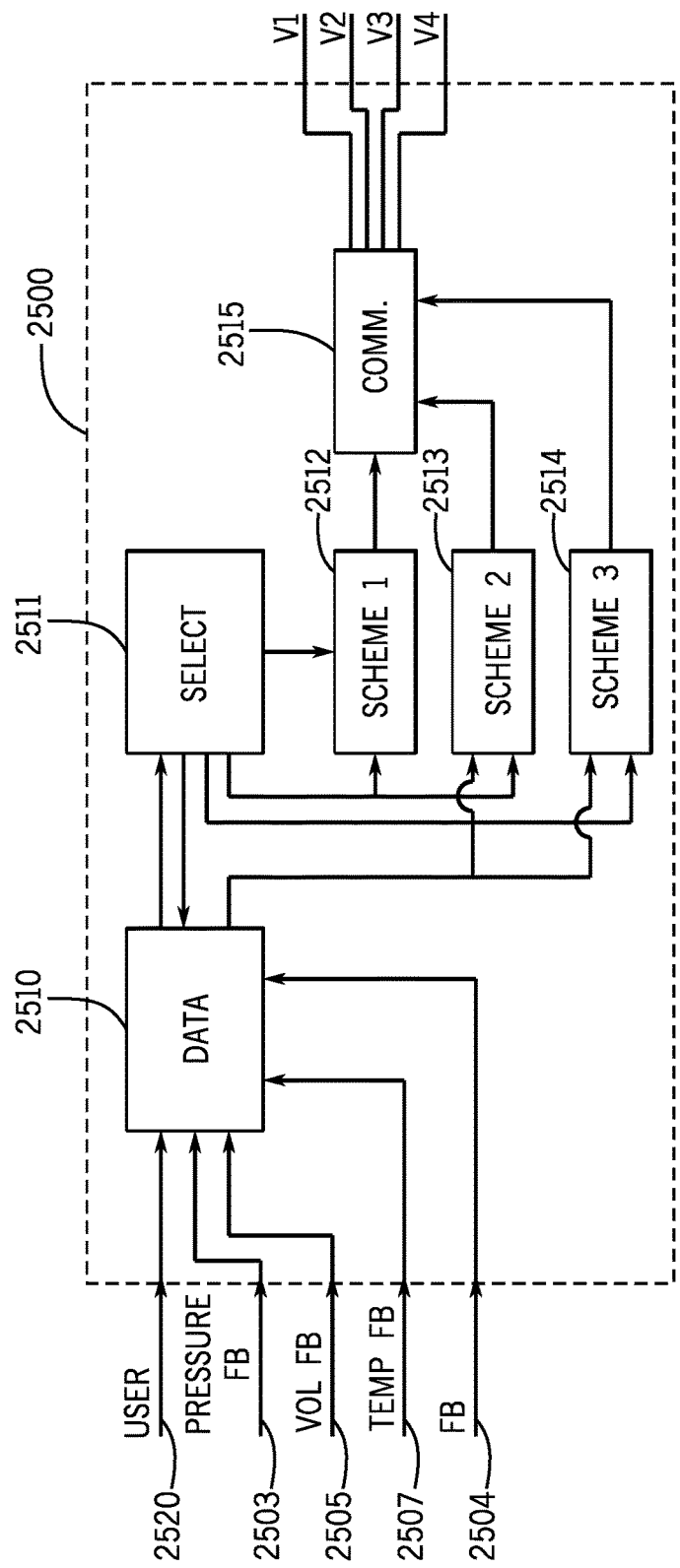
FIG. 25 is a block diagram of a controller used herein.

FIG. 25 shows a controller 2500 used to implement the fill schemes described above (or other fill schemes). Feedback is provided on any desired number of data inputs. The embodiment of FIG. 25 includes pressure feedback, volume feedback, temperature feedback, and other feedback, such as audible noise from gas flow, etc.) Any desired feedback may be used, and it may be obtained from one or more locations as described above. The feedback is provided on communication lines 2501-2509 to a data module 2510. Data module 2510 receives that data and provides it as needed to various fill scheme modules 2512-2514. The embodiment shown includes three fill scheme modules: fill scheme module 2512 provides a fair or even fill scheme, fill scheme module 2513 provides a first fill scheme, and fill scheme module 2514 provides a preferred fill scheme. Additional fill scheme modules may be provided as desired. A select module 2511 receives a user input that determines which fill scheme module is active, and provides a signal activating that module. The active fill scheme module (or modules if more than one is active) provides control signals though a communication module 2515 on lines V1-V4 that control various valves. Additional control outputs can be provided. Also, data such as usage, which control scheme module is active, etc. can be provided by module 2515 to the user, station manager, or an offsite location. Controller 2500 is located in one location in one alternative, distributed amongst dispensers, in another, and in other locations in other alternatives.

Various aspects of the fill schemes and alternatives described herein could be implemented below to derive multiple benefits.

Glossary—the following terms used herein have the meaning set forth below:

Activating mechanism refers to a mechanism that causes an action to occur, such as a lever, button, slide, etc.

Communication link refers to a link that allows data or command communication, and includes wired and wireless links.

CNG refers to compressed natural gas.

CNG station includes dispensers that can concurrently fill one or more vehicle tanks, storage tanks, tube trailers and other vessels and devices with CNG or other gaseous fuel, similar to a gas station that at which multiple vehicle tanks can be filled with gasoline or diesel fuel, and includes CNG compression stations; storage tanks; priority station; and dispensers.

Controllable fluid communication refers to a fluid path that can be controlled, such as opened, closed, or regulated.

Controller, as used herein, refers to the hardware and software that controls one or more dispensers. A controller can be centrally located, or dispersed amongst several locations, and can be located nearby or remotely.

Dispenser (or gas fuel dispenser) refers to a device used by vehicle driver to refill their vehicle with CNG or other gaseous fuel.

Dispensing sub-station refers to the components used to fill a vehicle tank with CNG or other gaseous fuel, similar to a gas pump and the related pipes, valves, meters, controllers, etc used to fill a vehicle tank with gasoline and fuel.

Fill scheme or fill control scheme refers to the logic used to determine the control of valves such that a desired filtrate for each of one or several vehicles is obtained.

Fill scheme module or flow control module refers to software and hardware in a controller used to implement a fill scheme. A module is active when the fill scheme of that mode is used to control the filtrate.

Fitting refers to the hardware and/or controller used to effectively combine two or more fluid flow paths to fill one vehicle tank.

High, Med, Low tanks refer to the 3 storage tanks used for storing CNG or other gaseous fuel until it is needed. At times all 3 may be up to 5000 psi but during busy times the tanks become depleted. If minimum target pressures are reached it triggers the compressor(s) to turn on to refill the tanks.

Hose assembly refers to assembly of components including hose, break-away, and nozzle which connects to a vehicle for refueling.

Priority panel refers to a cabinet, enclosure or other structure used to mount a series of valves and instruments to divert the gas flow from one or more compressor unit(s) to one or more storage vessel(s) and one or more dispenser(s). It can include a portion or all of the controller, or the controller can be located elsewhere Proportional valve: a valve whose flow is controlled proportionally to an analog or digital signal sent to the valve.

Storage vessels refers to vessel to store CNG or other gaseous fuel, and are also called pressure vessels or CNG tanks or banks.

Vehicle refers to any type of mobile device that has the ability to hold gaseous fuel, including cars, trucks, tube trailers, construction vehicles, etc.

Vehicle operator refers to anyone who operates a vehicle.

Numerous modifications may be made to the present disclosure which still fall within the intended scope hereof Thus, it should be apparent that there has been provided a method and apparatus for a refueling with CNG that fully satisfies the objectives and advantages set forth above. Although the disclosure has been described specific embodiments thereof it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A gaseous fuel station for filling vehicle tanks with fuel, comprising:
    a plurality of storage vessels, each at a unique pressure;
    a plurality of dispensing sub-stations, each dispensing sub-station comprising a dispensing hose and a controllable fluid flow path from each of the plurality of storage vessels to a vehicle tank;
    a fitting capable of connecting to the vehicle tank and capable of connecting to at least two dispensing sub-stations, whereby the flow into the tank is from at least two dispensing sub stations; and
    a controller, connected to control the controllable fluid paths.

2. The gaseous fuel station of claim 1, wherein each dispensing substation includes a customer-viewable gas flow meter that displays the flow into the vehicle tank.

* * * * *

UNITED STATES PATENT AND TRADEMARK OFFICE
CERTIFICATE OF CORRECTION

PATENT NO. : 10,718,468 B2
APPLICATION NO. : 15/136437
DATED : July 21, 2020
INVENTOR(S) : Rock J. Petit et al.

Page 1 of 1

It is certified that error appears in the above-identified patent and that said Letters Patent is hereby corrected as shown below:

In the Specification

Column 11, Line 16, replace "ifs" with --it's--.
Column 13, Line 23, replace "(lot)" with --(Iot)--.
Column 13, Line 24, replace "R5232 or R5422" with --RS232 or RS422--.
Column 16, Line 66, replace "filtrate" with --fill rate--.
Column 17, Line 4, replace "filtrate" with --fill rate--.

Signed and Sealed this
Twenty-ninth Day of September, 2020

Andrei Iancu
*Director of the United States Patent and Trademark Office*